(12) United States Patent
Li

(10) Patent No.: US 12,511,505 B2
(45) Date of Patent: Dec. 30, 2025

(54) ELECTRONIC DEVICE AND CONTROL METHOD

(71) Applicant: VIVO MOBILE COMMUNICATION CO., LTD., Guangdong (CN)

(72) Inventor: Zhiguang Li, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 11 days.

(21) Appl. No.: 18/607,512

(22) Filed: Mar. 17, 2024

(65) Prior Publication Data

US 2024/0220748 A1 Jul. 4, 2024

Related U.S. Application Data

(63) Continuation of application No. PCT/CN2022/118418, filed on Sep. 13, 2022.

(30) Foreign Application Priority Data

Sep. 17, 2021 (CN) .......................... 202111095325.9

(51) Int. Cl.
*G06K 7/10* (2006.01)
(52) U.S. Cl.
CPC ............................... *G06K 7/10366* (2013.01)
(58) Field of Classification Search
CPC ........... G06K 7/10366; G06K 7/10198; G06K 17/0025; H02J 50/12; H02J 50/80; H04B 5/45
See application file for complete search history.

(56) References Cited

U.S. PATENT DOCUMENTS

2017/0032603 A1 2/2017 Koizumi et al.

FOREIGN PATENT DOCUMENTS

| CN | 106394489 A | 2/2017 |
| CN | 113780501 A | 12/2021 |
| JP | 2005151257 A | 6/2005 |
| JP | 2012090175 A | 5/2012 |

OTHER PUBLICATIONS

M. Galizzi, M. Caldara, V. Re and A. Vitali, "A novel Qi-standard compliant full-bridge wireless power charger for low power devices," 2013 IEEE Wireless Power Transfer (WPT), Perugia, Italy, 2013, pp. 44-47, doi: 10.1109/WPT.2013.6556877. (Year: 2013).*
International Search Report and Written Opinion for Application No. PCT/CN2022/118418, dated Nov. 30, 2022, 14 Pages.

* cited by examiner

*Primary Examiner* — Matthew Mikels
(74) *Attorney, Agent, or Firm* — BROOKS KUSHMAN P.C.

(57) ABSTRACT

An electronic device and a control method. The electronic device includes a wireless charging circuit, an antenna module, and a matching circuit, where the matching circuit includes a first resonant capacitor, a first load modulation capacitor, a second load modulation capacitor, and an envelope detection circuit, and the wireless charging circuit includes a microcontroller unit, a demodulation circuit, a first half-bridge drive circuit, a second half-bridge drive circuit, a first load modulation circuit, and a second load modulation circuit.

20 Claims, 7 Drawing Sheets

ELECTRONIC DEVICE AND CONTROL METHOD

CROSS-REFERENCE TO RELATED APPLICATIONS

This application is a continuation of International Application No. PCT/CN2022/118418 filed on Sep. 13, 2022, which claims priority to Chinese Patent Application No. 202111095325.9 filed on Sep. 17, 2021, which are incorporated herein by reference in their entireties.

TECHNICAL FIELD

Embodiments of this application relate to the field of electronic technologies, and in particular, to an electronic device and a control method.

BACKGROUND

A 125K low-frequency radio frequency identification (RFID) technology is a near field communication identification technology with a carrier frequency of 125K to 135K hertz. Because of low costs and fast identification, the technology is widely used in access control. A wireless charging technology is a wireless energy transmission technology based on a carrier frequency of 110K to 190K hertz. To implement correct energy transmission, the wireless charging technology is also accompanied by a communications technology. In a process of implementing this application, the inventor finds that the prior art has at least the following problem: A layout area of an RFID circuit is relatively large. However, as a user increasingly requires portability of an electronic device, an existing electronic device has an increasingly small volume and limited space. Therefore, it is difficult to integrate an RFID card reader function into an existing electronic device.

SUMMARY

According to a first aspect, an embodiment of this application provides an electronic device, including a wireless charging circuit, an antenna module, and a matching circuit, where the matching circuit includes a first resonant capacitor, a first load modulation capacitor, a second load modulation capacitor, and an envelope detection circuit, and the wireless charging circuit includes a microcontroller unit, a demodulation circuit, an H-bridge drive circuit, a first load modulation circuit, and a second load modulation circuit, where
  the H-bridge drive circuit includes a first half-bridge drive circuit and a second half-bridge drive circuit, a first end of the first half-bridge drive circuit and a first end of the second half-bridge drive circuit are each electrically connected to a power supply end, a second end of the first half-bridge drive circuit and a second end of the second half-bridge drive circuit are each grounded, the first half-bridge drive circuit is electrically connected to the second half-bridge drive circuit sequentially by using the antenna module and the first resonant capacitor, and the H-bridge drive circuit is configured to drive the antenna module to operate in a wireless charging transmit mode, a wireless charging receive mode, an RFID card reader mode, or an RFID card simulation mode;
  the first load modulation circuit is separately electrically connected to the antenna module and the envelope detection circuit by using the first load modulation capacitor, the second load modulation circuit is separately electrically connected to the antenna module, the first resonant capacitor, and the envelope detection circuit by using the second load modulation capacitor, and the envelope detection circuit is further electrically connected to the demodulation circuit; and
  the microcontroller unit is separately electrically connected to the demodulation circuit, the first load modulation circuit, the second load modulation circuit, the first half-bridge drive circuit, and the second half-bridge drive circuit.

According to a second aspect, an embodiment of this application provides a control method, applied to the electronic device according to the first aspect, and the method includes:
  determining a first operating mode in which the electronic device is located, where the first operating mode is a wireless charging receive mode, a wireless charging transmit mode, an RFID card reader mode, or an RFID card simulation mode; and
  controlling an operating state of the electronic device based on the first operating mode.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may derive other drawings from these accompanying drawings without creative efforts.

DETAILED DESCRIPTION

The following clearly and completely describes technical solutions in embodiments of this application with reference to accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in this specification and claims of this application are used to distinguish between similar objects instead of describing a specific order or sequence. It should be understood that data used in such a way are interchangeable in proper circumstances, so that the embodiments of this application can be implemented in an order other than the order illustrated or described herein.

Objects classified by "first", "second", and the like are usually of a same type, and the number of objects is not limited. For example, there may be one or more first objects. In addition, in this specification and the claims, "and/or" represents at least one of connected objects, and a character "/" generally represents an "or" relationship between associated objects.

With reference to the accompanying drawings, an electronic device provided in the embodiments of this application will be described in detail by using some embodiments and application scenarios thereof.

Figure 1:
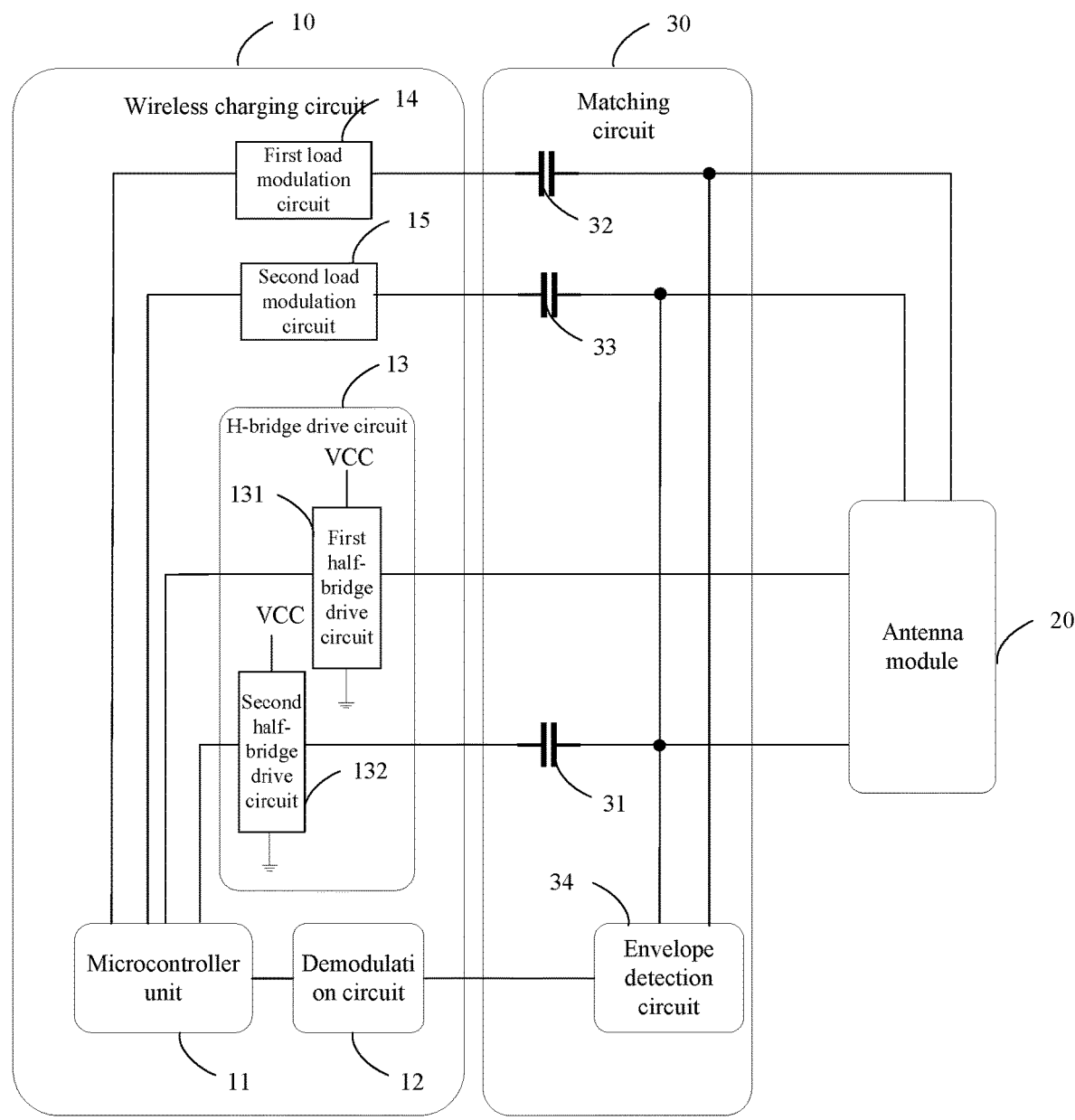
FIG. 1 is a first structural diagram of an electronic device according to an embodiment of this application.

In this embodiment of this application, as shown in FIG. 1, the electronic device may include a wireless charging circuit 10, an antenna module 20, and a matching circuit 30.

The matching circuit 30 may include a first resonant capacitor 31, a first load modulation capacitor 32, a second load modulation capacitor 33, and an envelope detection circuit 34. In actual application, there may be one or more first resonant capacitors 31, first load modulation capacitors 32, and second load modulation capacitors 33. This may be specifically determined according to an actual requirement, and is not limited in this embodiment of this application.

The wireless charging circuit 10 may include a microcontroller unit 11, a demodulation circuit 12, an H-bridge drive circuit 13, a first load modulation circuit 14, and a second load modulation circuit 15.

Further, the H-bridge drive circuit 13 may include a first half-bridge drive circuit 131 and a second half-bridge drive circuit 132, a first end of the first half-bridge drive circuit 131 and a first end of the second half-bridge drive circuit 132 are each electrically connected to a power supply end (VCC), a second end of the first half-bridge drive circuit and a second end of the second half-bridge drive circuit are each grounded, and the first half-bridge drive circuit 131 is electrically connected to the second half-bridge drive circuit 132 sequentially by using the antenna module 20 and the first resonant capacitor 31.

The first load modulation circuit 14 is separately electrically connected to the antenna module 20 and the envelope detection circuit 34 by using the first load modulation capacitor 32, the second load modulation circuit 15 is separately electrically connected to the antenna module 20, the first resonant capacitor 31, and the envelope detection circuit 34 by using the second load modulation capacitor 33, and the envelope detection circuit 34 is further electrically connected to the demodulation circuit 12.

The microcontroller unit 11 is separately electrically connected to the demodulation circuit 12, the first load modulation circuit 14, the second load modulation circuit 15, the first half-bridge drive circuit 131, and the second half-bridge drive circuit 132.

In specific implementation, the wireless charging circuit 10 may be an Integrated Circuit (IC). In this case, the wireless charging circuit 10 may be referred to as a wireless charging IC. Certainly, in another implementation, the wireless charging circuit 10 may not be integrated. This may be specifically determined according to an actual situation, and is not limited in this embodiment of this application.

The H-bridge drive circuit 13 may be configured to drive the antenna module 20 to operate in a wireless charging transmit mode, a wireless charging receive mode, an RFID card reader mode, or an RFID card simulation mode. In specific implementation, the antenna module 20 may include at least one coil. The H-bridge drive circuit 13 may be configured to drive some or all of the at least one coil in the antenna module to oscillate, so as to implement wireless charging, reverse wireless charging, RFID card identification, or RFID card simulation. Therefore, the H-bridge drive circuit may also be referred to as a coil drive circuit or an H-bridge coil drive circuit. In specific implementation, in an implementation, the H-bridge drive circuit 13 may drive a coil to oscillate by using one half-bridge drive circuit. In this case, it may be considered that the H-bridge drive circuit 13 is in a half-bridge drive mode. In another implementation, the H-bridge drive circuit 13 may drive a coil by using two half-bridge drive circuits. In this case, it may be considered that the H-bridge drive circuit 13 is in an H-bridge drive mode.

The first load modulation circuit 14 and the second load modulation circuit 15 may be configured to perform load modulation, so as to perform protocol communication with a wireless charging transmit device or implement card number sending.

The envelope detection circuit 34 may be configured to filter a carrier and reserve a baseband signal. The demodulation circuit 12 may be configured to demodulate a baseband signal to obtain a charging power expected by a charging receive device or a card number of an RFID card. The envelope detection circuit 34 and the demodulation circuit 12 may be configured to: determine a transmit power of the antenna module 20, where the transmit power is determined based on a charging power expected by the charging receive device; and determine the card number of the RFID card. In this embodiment of this application, the RFID card may be an entity RFID card, or may be an analog RFID card.

It may be understood that, in addition to the wireless charging circuit 10, the antenna module 20, and the matching circuit 30, the electronic device may further include another component, such as an application processor that is configured to implement overall control of the electronic device, and may store a card number and send the card number in a wireless communication manner or a Universal Serial Bus (USB) connection manner.

In this embodiment of this application, an operating mode of the electronic device may include a wireless charging receive mode, a wireless charging transmit mode, an RFID card reader mode, and an RFID card simulation mode.

In a case that the electronic device is in the wireless charging receive mode, the electronic device is equivalent to the wireless charging receive device, and may perform the following operations: implementing load modulation by using a load modulation circuit, so as to perform protocol communication with the wireless charging transmit device, and driving a coil in the antenna module to oscillate to implement full-bridge rectification effect, thereby implementing wireless charging.

In a case that the electronic device is in the wireless charging transmit mode, the electronic device is equivalent to the wireless charging transmit device, and may perform the following operations: driving a coil in the antenna module to implement reverse wireless charging, and determining the transmit power of the antenna module by using the envelope detection circuit and the demodulation circuit.

In a case that the electronic device is in the RFID card reader mode, the electronic device is equivalent to an RFID card reader device, and may perform the following operations: driving a coil in the antenna module to implement a card reader function, and determining the card number of the RFID card by using the envelope detection circuit and the demodulation circuit.

In a case that the electronic device is in the RFID card simulation mode, the electronic device is equivalent to an RFID card, and may implement load modulation by using a load modulation circuit, so as to implement card number sending.

Figure 2:
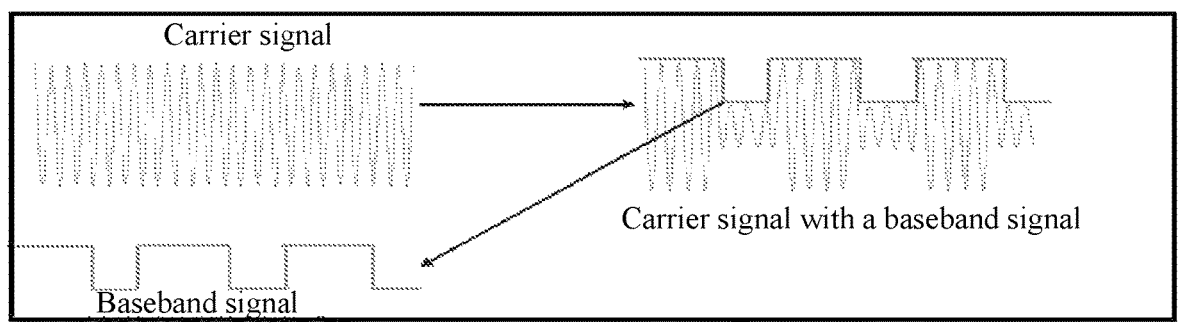
FIG. 2 is a schematic diagram of signal transmission according to an embodiment of this application.

The wireless charging transmit mode (or the RFID card reader mode) may be specifically implemented in the following manner: As shown in FIG. 2, the H-bridge drive circuit 13 may drive a coil in the antenna module 20 to oscillate, radiate outward, and transmit a carrier signal. After receiving the carrier signal, the wireless charging receive device (or the RFID card) starts load modulation, so that an amplitude of a carrier changes, and a carrier signal with a load modulation signal is formed on one end of the coil near a resonant capacitor. The carrier with the load modulation signal is transmitted to the envelope detection circuit 34, and the envelope detection circuit 34 filters out the carrier, reserves a baseband signal, and transmits the baseband signal to the demodulation circuit 12. The demodulation circuit 12 is configured to demodulate the baseband signal to obtain the charging power expected by the charging receive device (or the card number of the RFID card).

It can be learned that in this embodiment of this application, in a manner of sharing some hardware, only a small quantity of components need to be added, so that the electronic device supports a wireless charging receive function, a wireless charging transmit function, an RFID card reader function, and an RFID card simulation function, so that a function of the electronic device can be enriched in a case that a volume of the electronic device is hardly affected.

In this embodiment of this application, the wireless charging receive mode, the wireless charging transmit mode, the RFID card reader mode, and the RFID card simulation mode may be implemented by sharing at least one of the following: a wireless charging circuit, a coil, and a matching circuit. Specific descriptions are as follows.

Implementation 1

Figure 3:
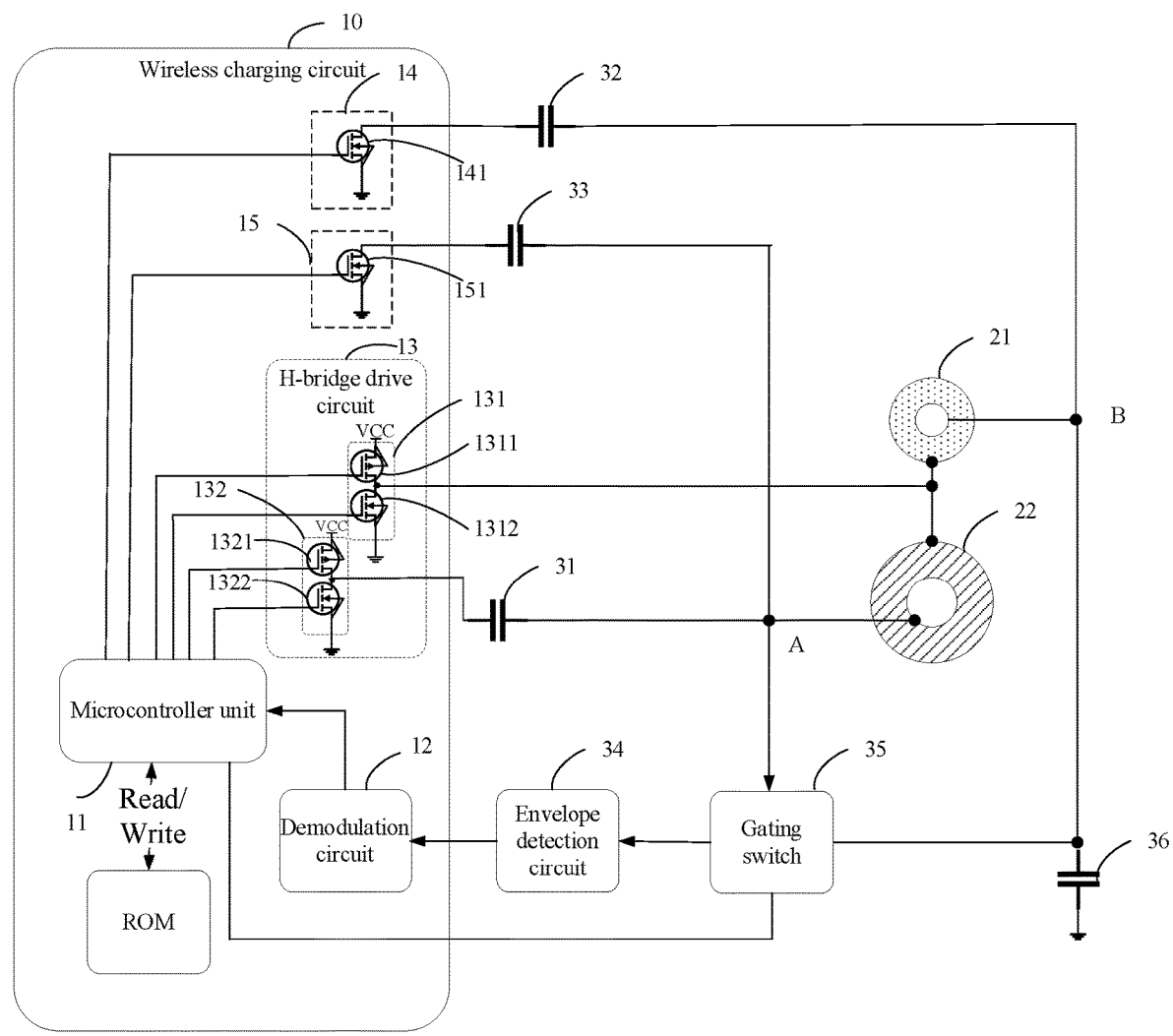
FIG. 3 is a second structural diagram of an electronic device according to an embodiment of this application.

As shown in FIG. 3, optionally, the antenna module 20 may include a radio frequency identification RFID coil 21 and a wireless charging coil 22, the matching circuit may further include a gating switch 35 and a second resonant capacitor 36.

A first end of the second resonant capacitor 36 is electrically connected to the first load modulation circuit 14 by using the first load modulation capacitor 32, and a second end of the second resonant capacitor 36 is grounded.

The gating switch 35 is separately electrically connected to a first point (denoted as A in the figure), a second point (denoted as B in the figure), the envelope detection circuit 34, and the microcontroller unit 11. The first point is a common point between the first resonant capacitor 31 and a second end of the wireless charging coil 22, and the second point is a common point between the first load modulation capacitor 32 and the second resonant capacitor 36.

A first end of the RFID coil 21 is electrically connected to the first half-bridge drive circuit 131, and a second end of the RFID coil 21 is electrically connected to the second point.

A first end of the wireless charging coil 22 is electrically connected to the first half-bridge drive circuit 131, and the second end of the wireless charging coil 22 is electrically connected to the second half-bridge drive circuit 132 by using the first resonant capacitor 31.

The second load modulation circuit 15 is electrically connected to the first point by using the second load modulation capacitor 33.

In this implementation, the first load modulation circuit 14 may be configured to send a card number. The second load modulation circuit 15 is configured to implement protocol communication with the wireless charging transmit device.

The RFID coil 21 is configured to implement card number identification of the RFID card. The wireless charging coil 22 is configured to implement wireless charging or reverse wireless charging. Therefore, the second resonant capacitor 36 connected to the RFID coil 21 may be referred to as an RFID resonant capacitor, and the first load modulation capacitor 32 connected to the RFID coil 21 may be referred to as an RFID load modulation capacitor. The first resonant capacitor 31 connected to the wireless charging coil 22 may be referred to as a wireless charging resonant capacitor, and the second load modulation capacitor 33 connected to the wireless charging coil 22 may be referred to as a wireless charging load modulation capacitor.

The gating switch 35 may connect the envelope detection circuit 34 and the first point. In this case, the envelope detection circuit 34 and the demodulation circuit 12 are configured to determine the charging power expected by the wireless charging receive device. The gating switch 35 may alternatively connect the envelope detection circuit 34 and the second point. In this case, the envelope detection circuit 34 and the demodulation circuit 12 are configured to determine the card number of the RFID card.

In Implementation 1, the wireless charging coil 22 and the RFID coil 21 are completely independently designed, the wireless charging circuit is shared, the resonant capacitor and the load modulation capacitor in the matching circuit are independently designed, and the envelope detection circuit 34 is shared by using the gating switch 35, so that the electronic device supports a wireless charging receive function, a wireless charging transmit function, an RFID card reader function, and an RFID card simulation function.

The following describes operating states of the electronic device in different operating modes.

1) For the Wireless Charging Receive Mode

In this mode, the electronic device may perform protocol communication with the wireless charging transmit device by using the second load modulation circuit 15, and may drive the wireless charging coil 22 by using the H-bridge drive circuit 13 to implement wireless charging.

In specific implementation, the electronic device may control the first load modulation circuit 14 to be in an off state, so as to reduce power consumption. The electronic device may control the second load modulation circuit 15 to be in an on state or an off state alternately according to a first preset frequency, so as to perform protocol communication with the wireless charging transmit device.

The H-bridge drive circuit 13 may drive the wireless charging coil 22 to oscillate by using the H-bridge drive mode, to implement full-bridge rectification effect, thereby implementing wireless charging.

During implementation, the microcontroller unit 11 may control the first half-bridge drive circuit 131 and the second half-bridge drive circuit 132 to alternately connect to the power supply end or be grounded at a second preset frequency, that is, at a same moment, one of the first half-bridge drive circuit 131 and the second half-bridge drive circuit 132 is connected to the power supply end but is not grounded, and the other half-bridge drive circuit is not connected to the power supply end but is grounded. For example, first, the first half-bridge drive circuit 131 may be controlled to connect to the power supply end, and the second half-bridge drive circuit 132 is controlled to be grounded. Then, the first half-bridge drive circuit 131 is controlled to be grounded, and the second half-bridge drive circuit 132 is controlled to connect to the power supply end.

In a case that the first half-bridge drive circuit 131 is connected to the power supply end and the second half-bridge drive circuit 132 is grounded, the power supply end of the first half-bridge drive circuit 131, the wireless charging coil 22, the wireless charging resonant capacitor, and the ground of the second half-bridge drive circuit 132 form a path, and a current flows from the power supply end connected to the first half-bridge drive circuit 131 to the ground of the second half-bridge drive circuit 132 to form a forward current.

In a case that the first half-bridge drive circuit 131 is grounded and the second half-bridge drive circuit 132 is connected to the power supply end, the ground of the first half-bridge drive circuit 131, the wireless charging coil 22, the wireless charging resonant capacitor, and the power supply end of the second half-bridge drive circuit 132 form a path, and a current flows from the power supply end connected to the second half-bridge drive circuit 132 to the ground of the first half-bridge drive circuit 131 to form a reverse current.

Because the first half-bridge drive circuit 131 and the second half-bridge drive circuit 132 are alternately connected to the power supply end and grounded, a reciprocal oscillating current is formed, so that an oscillating voltage of the coil of the wireless charging transmit device changes, to implement full-bridge rectification effect, thereby implementing wireless charging.

2) For the Wireless Charging Transmit Mode

In this mode, the electronic device may drive the wireless charging coil 22 by using the H-bridge drive circuit 13 to implement wireless charging. In specific implementation, the H-bridge drive circuit 13 may drive the wireless charging coil 22 to oscillate by using the H-bridge drive mode, thereby implementing reverse wireless charging. During implementation, the microcontroller unit 11 may control the first half-bridge drive circuit 131 and the second half-bridge drive circuit 132 to alternately connect to the power supply end or be grounded at a second preset frequency. For specific implementation, refer to the foregoing related description. Details are not described herein.

The gating switch 35 may connect the envelope detection circuit 34 and the first point, so that after demodulating a load modulation signal, the envelope detection circuit 34 and the demodulation circuit 12 may obtain the charging power expected by the charging receive device, and the electronic device may be further triggered to adjust the transmit power of the antenna module 20.

The electronic device may control the first load modulation circuit 14 and the second load modulation circuit 15 to be in an off state, so as to reduce power consumption.

3) For the RFID Card Reader Mode

In this mode, the electronic device may drive the RFID coil 21 by using the H-bridge drive circuit 13 to implement card number identification of the RFID card. To avoid interference from the wireless charging coil 22, the electronic device may control the second half-bridge drive circuit 132 to be in an off state. In this case, the H-bridge drive circuit 13 is in the half-bridge drive mode.

In specific implementation, the microcontroller unit 11 may control the first half-bridge drive circuit 131 to alternately connect to the power supply end or be grounded, that is, at a same moment, the first half-bridge drive circuit 131 is connected to the power supply end or grounded. For example, first, the first half-bridge drive circuit 131 may be controlled to connect to the power supply end but not to be grounded. Then, the first half-bridge drive circuit 131 is controlled to be grounded but not to connect to the power supply end.

In a case that the first half-bridge drive circuit 131 is connected to the power supply end but is not grounded, the power supply end of the first half-bridge drive circuit 131, a third coil 25, the second resonant capacitor 36, and the ground form a path, and a current flows from the power supply end connected to the first half-bridge drive circuit 131 to the ground to form a forward current.

In a case that the first half-bridge drive circuit 131 is grounded but is not connected to the power supply end, the second resonant capacitor 36, a third coil 25, and the ground of the first half-bridge drive circuit 131 form a path, and a current flows from the second resonant capacitor 36 to the ground of the first half-bridge drive circuit 131 to form a reverse current.

The gating switch 35 may connect the envelope detection circuit 34 and the second point. In this case, the envelope detection circuit 34 and the demodulation circuit 12 may learn the card number of the RFID card after demodulating a load modulation signal.

The electronic device may control the first load modulation circuit 14 and the second load modulation circuit 15 to be in an off state, so as to reduce power consumption.

4) For the RFID Card Simulation Mode

In this mode, the electronic device may implement card number sending by using the first load modulation circuit 14 and the first half-bridge drive circuit 131. To ensure that the RFID coil can form a variable load, a loop current may be formed or a current loop may be disconnected on a path in which the first load modulation circuit 14 and the first half-bridge drive circuit 131 are located. In the circuit path, as long as one end of the circuit path is disconnected, the path may be disconnected. Therefore, card number sending may be performed by using the first load modulation circuit 14 and the first half-bridge drive circuit 131 in the following manner:

First implementation: First, the first load modulation circuit 14 may be controlled to be in an on state at a preset frequency, and the first half-bridge drive circuit 131 is controlled to be grounded. Then, the first load modulation circuit 14 is controlled to be in an off state, and the first half-bridge drive circuit 131 is controlled not to be grounded. This is repeated.

Second implementation: The first load modulation circuit 14 may be controlled to keep an on state, and the first half-bridge drive circuit 131 is controlled to be alternately grounded and not grounded at a preset frequency.

Third implementation: The first half-bridge drive circuit 131 may be controlled to be directly in a grounded state, and the first load modulation circuit 14 is controlled to be alternately on or off at a preset frequency.

The electronic device may control the second load modulation circuit 15, the first load modulation circuit 14, and the second load modulation circuit 15 to be in an off state, so as to reduce power consumption.

Implementation 2

Figure 4:
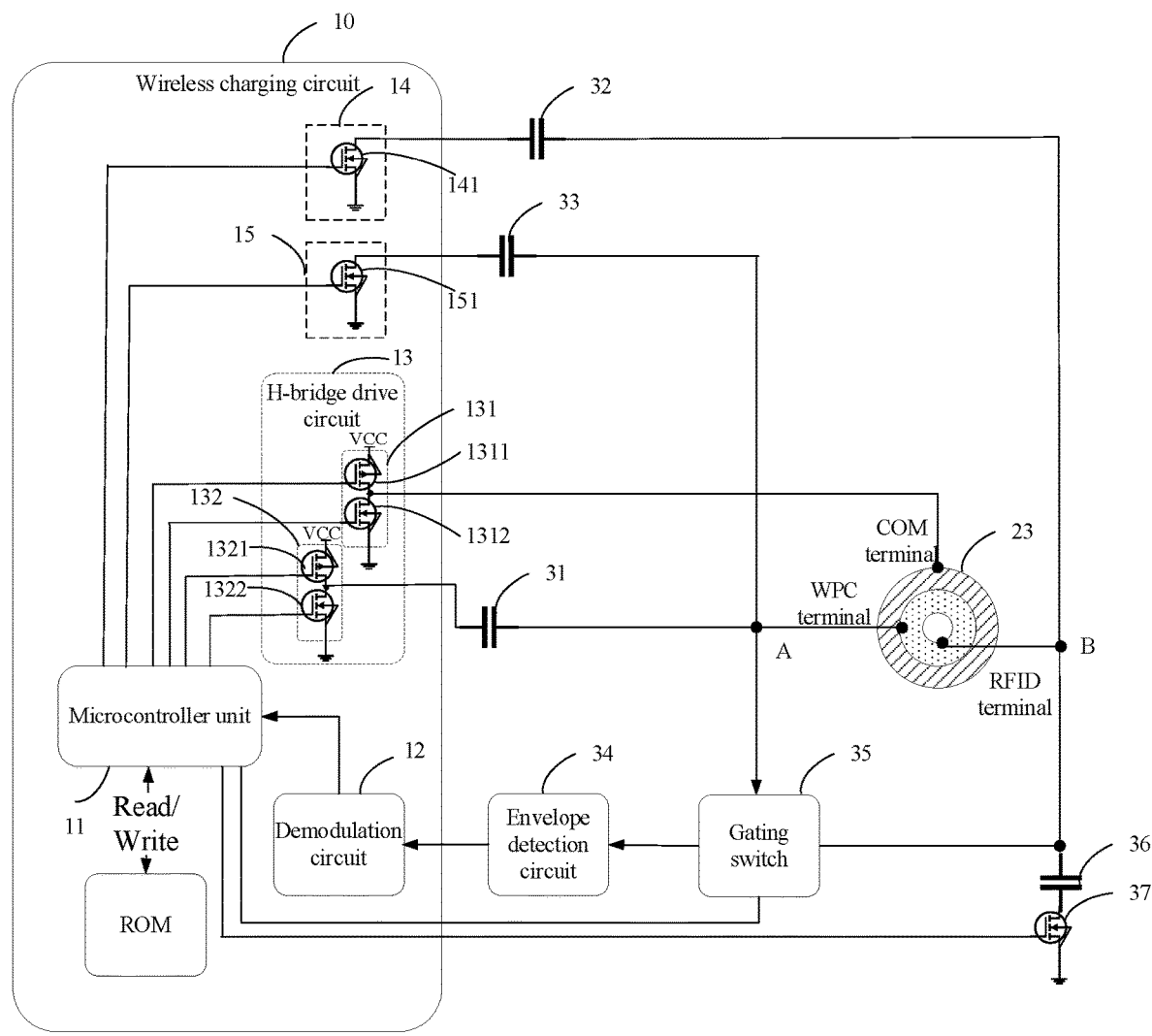
FIG. 4 is a third structural diagram of an electronic device according to an embodiment of this application.

As shown in FIG. 4, optionally, the antenna module 20 includes a first coil 23. The first coil 23 includes a drive common (COM) terminal, a wireless power charge (WPC) terminal, and an RFID terminal, and the WPC terminal is located between the drive common terminal and the RFID terminal. The matching circuit further includes a gating switch 35, a second resonant capacitor 36, and a first switch 37.

A first end of the second resonant capacitor 36 is electrically connected to the first load modulation circuit 14 by using the first load modulation capacitor 32, and a second end of the second resonant capacitor 36 is grounded by using the first switch 37.

The gating switch 35 is separately electrically connected to a first point, a second point, the envelope detection circuit 34, and the microcontroller unit 11, the first point is a common point between the first resonant capacitor 31 and the WPC terminal, and the second point is a common point between the second resonant capacitor 36 and the first load modulation capacitor 32.

The drive common terminal is electrically connected to the first half-bridge drive circuit 131, the WPC terminal is electrically connected to the second half-bridge drive circuit 132 by using the first resonant capacitor 31, and the RFID terminal is electrically connected to the second point.

The second load modulation circuit 15 is electrically connected to the first point by using the second load modulation capacitor 33.

In this implementation, the first load modulation circuit 14 may be configured to send a card number. The second load modulation circuit 15 is configured to implement protocol communication with the wireless charging transmit device.

A part between the drive COM terminal and the WPC terminal of the first coil 23 may be equivalent to a wireless charging coil, and may be configured to implement wireless charging or reverse wireless charging. A part between the drive COM terminal of the first coil 23 and the RFID terminal may be equivalent to an RFID identification coil, and may be configured to implement card number identification of the RFID card. Therefore, the second resonant capacitor 36 connected to the RFID terminal of the first coil 23 may be referred to as an RFID resonant capacitor, and the first load modulation capacitor 32 connected to the RFID terminal of the first coil 23 may be referred to as an RFID load modulation capacitor. The first resonant capacitor 31 connected to the WPC terminal of the first coil 23 may be referred to as a wireless charging resonant capacitor, and the second load modulation capacitor 33 connected to the WPC terminal of the first coil 23 may be referred to as a wireless charging load modulation capacitor.

It may be learned from the foregoing that, the electronic device shares some coils so that the electronic device implements the RFID identification technology and the wireless charging technology. The RFID identification technology and the wireless charging technology share some coils. To avoid mutual interference between the wireless charging technology and the RFID identification technology, the second resonant capacitor 36 and the first switch 37 are added.

In addition, a gating switch 35 is added, so that the envelope detection circuit 34 and the demodulation circuit 12 separately perform signal demodulation in different technologies. In specific implementation, the gating switch 35 may connect the envelope detection circuit 34 and the first point. In this case, the envelope detection circuit 34 and the demodulation circuit 12 are configured to determine the charging power expected by the wireless charging receive device. The gating switch 35 may alternatively connect the envelope detection circuit 34 and the second point. In this case, the envelope detection circuit 34 and the demodulation circuit 12 are configured to determine the card number of the RFID card.

It can be learned that in Implementation 2, a wireless charging circuit is completely shared, and the matching circuit and the coil are partially shared, so that the electronic device supports the wireless charging transmit mode and the RFID card reader mode.

The following describes operating states of the electronic device in different operating modes.

1) For the Wireless Charging Receive Mode

In this mode, the electronic device may perform protocol communication with the wireless charging transmit device by using the second load modulation circuit 15, and may drive a part of the drive COM terminal and the WPC terminal of the first coil 23 by using the H-bridge drive circuit 13 to implement wireless charging.

In specific implementation, the electronic device may control the first load modulation circuit 14 to be in an off state, so as to reduce power consumption. The electronic device may control the second load modulation circuit 15 to be in an on state or an off state alternately according to a first preset frequency, so as to perform protocol communication with the wireless charging transmit device.

The H-bridge drive circuit 13 may drive the part of the drive COM terminal and the WPC terminal of the first coil 23 to oscillate by using the H-bridge drive mode, to implement full-bridge rectification effect, thereby implementing wireless charging. During implementation, the microcontroller unit 11 may control the first half-bridge drive circuit 131 and the second half-bridge drive circuit 132 to alternately connect to the power supply end or be grounded at a second preset frequency, so that an oscillating voltage of the coil of the wireless charging transmit device changes, to implement full-bridge rectification effect, thereby implementing wireless charging. For specific implementation, refer to the related description of Implementation 1. Details are not described herein.

In this implementation, the RFID identification technology and the wireless charging technology share some coils. To avoid interference from the RFID identification technology, the microcontroller unit 11 may control the first switch 37 to keep an off state.

2) For the Wireless Charging Transmit Mode

In this mode, the electronic device may drive a part of the drive COM terminal and the WPC terminal of the first coil 23 by using the H-bridge drive circuit 13 to implement wireless charging.

In specific implementation, the H-bridge drive circuit 13 may drive the wireless charging coil 22 to oscillate by using the H-bridge drive mode, thereby implementing reverse wireless charging. During implementation, the microcontroller unit 11 may control the first half-bridge drive circuit 131 and the second half-bridge drive circuit 132 to alternately connect to the power supply end or be grounded at a second preset frequency. For specific implementation, refer to the foregoing related description. Details are not described herein.

To prevent the part between the WPC terminal and the RFID terminal of the first coil 23 from affecting a wireless charging function, the microcontroller unit 11 may control the first switch 37 to be turned off.

The gating switch 35 may connect the envelope detection circuit 34 and the first point, so that after demodulating a load modulation signal, the envelope detection circuit 34 and the demodulation circuit 12 may obtain the charging power expected by the charging receive device, and the electronic device may be further triggered to adjust the transmit power of the antenna module 20.

The electronic device may control the first load modulation circuit 14 and the second load modulation circuit 15 to be in an off state, so as to reduce power consumption.

3) For the RFID Card Reader Mode

In this mode, the electronic device may drive a part of the drive COM terminal and the RFID terminal of the first coil 23 by using the H-bridge drive circuit 13 to implement card number identification of the RFID card. To avoid interference from the wireless charging technology, the electronic device may control the second half-bridge drive circuit 132 to be in an off state. In this case, the H-bridge drive circuit 13 is in the half-bridge drive mode.

In specific implementation, the microcontroller unit 11 may control the first half-bridge drive circuit 131 to alternately connect to the power supply end or be grounded, that is, at a same moment, the first half-bridge drive circuit 131 is connected to the power supply end or grounded. For details, refer to the foregoing related description. Details are not described herein.

The gating switch 35 may connect the envelope detection circuit 34 and the second point. In this case, the envelope detection circuit 34 and the demodulation circuit 12 may learn the card number of the RFID card after demodulating a load modulation signal.

The electronic device may control the first load modulation circuit 14 and the second load modulation circuit 15 to be in an off state, so as to reduce power consumption.

4) For the RFID Card Simulation Mode

This mode may be implemented in any one of the following manners:

Manner 1: The electronic device may implement card number sending by using the first load modulation circuit 14 and the first half-bridge drive circuit 131.

In this manner, to ensure that the first coil 23 can form a variable load, a loop current may be formed or a current loop may be disconnected on a path in which the first load modulation circuit 14 and the first half-bridge drive circuit 131 are located. In specific implementation, first, the first load modulation circuit 14 may be controlled to be in an on state, and the first half-bridge drive circuit 131 is controlled to be grounded. Then, the first load modulation circuit 14 is controlled to be in an off state, and/or the first half-bridge drive circuit 131 is controlled not to be grounded. This is repeated.

In this manner, the electronic device may control the second load modulation circuit 15 and the second half-bridge drive circuit 132 to be in an off state, so as to reduce power consumption and avoid interference from a wireless charging function to RFID card simulation.

Manner 2: The electronic device may implement card number sending by using the first load modulation circuit 14 and the first switch 37.

In this manner, to ensure that the first coil 23 can form a variable load, a loop current may be formed or a current loop may be disconnected on a path in which the first load modulation circuit 14 and the first switch 37 are located. In specific implementation, first, the first load modulation circuit 14 may be controlled to be in an on state, and the first switch 37 is controlled to be turned on. Then, the first load modulation circuit 14 is controlled to be in an off state, and/or the first switch 37 is controlled to be turned off. This is repeated.

In this manner, the electronic device may control the second load modulation circuit 15, the first half-bridge drive circuit, and the second half-bridge drive circuit 132 to be in an off state, so as to reduce power consumption and avoid interference from a wireless charging function to RFID card simulation.

Manner 3: The electronic device may implement card number sending by using the first load modulation circuit 14, the first half-bridge drive circuit 131, and the first switch 37.

In this manner, to ensure that the first coil 23 can form a variable load, first, the first load modulation circuit 14 may be controlled to be in an on state, the first half-bridge drive circuit 131 is controlled to be grounded, and the first switch 37 is controlled to be turned on. Then, the first load modulation circuit 14 is controlled to be in an off state, and/or the first half-bridge drive circuit 131 is controlled not to be grounded, and/or the first switch 37 is controlled to be turned off. This is repeated.

In this manner, the electronic device may control the second load modulation circuit 15 to be in an off state, so as to reduce power consumption and avoid interference from a wireless charging function to RFID card simulation.

Implementation 3

Figure 5:
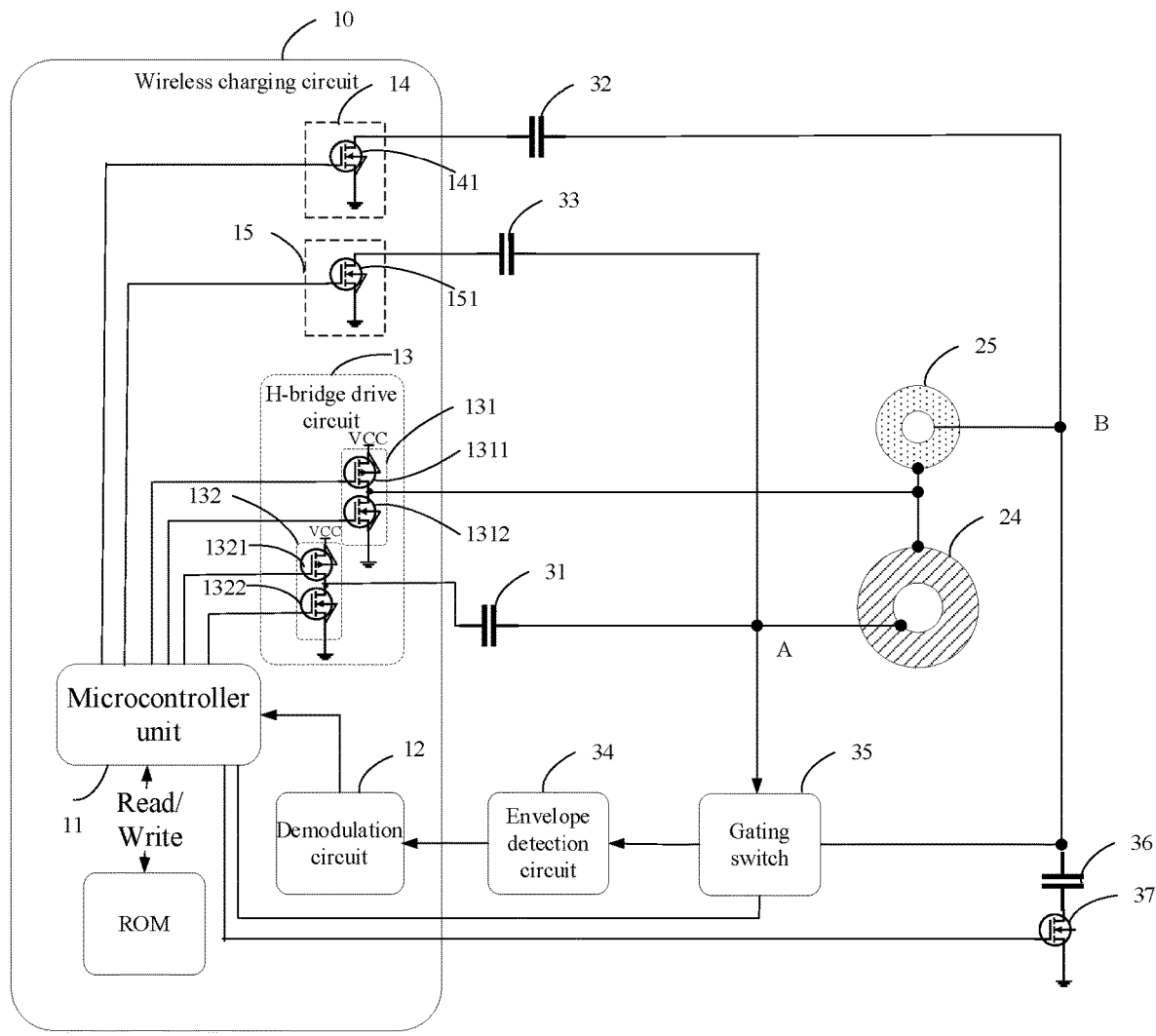
FIG. 5 is a fourth structural diagram of an electronic device according to an embodiment of this application.

As shown in FIG. 5, optionally, the antenna module 20 may include a second coil 24 and a third coil 25. The matching circuit further includes a gating switch 35, a second resonant capacitor 36, and a first switch 37.

A first end of the second resonant capacitor 36 is electrically connected to the first load modulation circuit 14 by using the first load modulation capacitor 32, and a second end of the second resonant capacitor 36 is grounded by using the first switch 37.

The gating switch 35 is separately electrically connected to a first point, a second point, the envelope detection circuit 34, and the microcontroller unit 11, the first point is a common point between the first resonant capacitor 31 and a second end of the second coil 24, and the second point is a common point between the second resonant capacitor 36 and the first load modulation capacitor 32.

A first end of the second coil 24 is electrically connected to the first half-bridge drive circuit 131, and the second end of the second coil 24 is electrically connected to the second half-bridge drive circuit 132 by using the first resonant capacitor 31.

A first end of the third coil 25 is electrically connected to the first half-bridge drive circuit 131, and a second end of the third coil 25 is electrically connected to the second point.

The second load modulation circuit 15 is electrically connected to the first point by using the second load modulation capacitor 33.

A main difference between Implementation 3 and Implementation 1 is that the first switch 37 is added in Implementation 3 relative to Implementation 1, so that the second coil 24 and the third coil 25 can be independently controlled in Implementation 3. Therefore, in Implementation 3, the four operating modes of the electronic device may be implemented by using a single coil, or the four operating modes of the electronic device may be implemented by using a dual coil. This may be specifically determined according to an actual situation, and is not limited in this embodiment of this application.

The second coil 24 may be configured to implement wireless charging or reverse wireless charging, and/or implementing card number identification of the RFID card. The third coil 25 may be configured to implement wireless charging or reverse wireless charging, and/or implementing card number identification of the RFID card.

The first load modulation circuit 14 may be configured to implement card number sending, and/or implement protocol communication with the wireless charging transmit device. The second load modulation circuit 15 may be configured to implement card number sending, and/or implement protocol communication with the wireless charging transmit device.

The following describes operating states of the electronic device in different operating modes.

1) For the Wireless Charging Receive Mode

In this implementation, the electronic device may implement wireless charging by using the second coil 24 and/or the third coil 25. This is separately described as follows:

a) Wireless Charging is Implemented by Using the Second Coil 24.

To avoid interference from the third coil 25, the microcontroller unit 11 may control the first load modulation circuit 14 to be in an off state, and the first switch 37 is in an off state.

The microcontroller unit 11 may first control the second load modulation circuit 15 to be in an on state, control the second half-bridge drive circuit 132 to be grounded, then control the second load modulation circuit 15 to be in an off state, and control the second half-bridge drive circuit 132 not to be grounded. This is performed alternately so as to form load modulation, to implement protocol communication with the wireless charging transmit device, and notify the wireless charging transmit device of the charging power required.

The H-bridge drive circuit 13 may drive the second coil 24 to oscillate by using the H-bridge drive mode, to implement full-bridge rectification effect, thereby implementing wireless charging. During implementation, the microcontroller unit 11 may control the first half-bridge drive circuit 131 and the second half-bridge drive circuit 132 to alternately connect to the power supply end or be grounded at a second preset frequency, so that an oscillating voltage of the coil of the wireless charging transmit device changes, to implement full-bridge rectification effect, thereby implementing wireless charging. For specific implementation, refer to the related description of Implementation 1. Details are not described herein.

b) Wireless Charging is Implemented by Using the Third Coil 25.

To avoid interference of the second coil 24, the microcontroller unit 11 may control the second half-bridge drive circuit 132 to be in an off state.

The microcontroller unit 11 may control the first load modulation circuit 14 and the first switch 37, or control the first load modulation circuit 14 and the first half-bridge drive circuit 131 to form load modulation, to implement protocol communication with the wireless charging transmit device, and notify the wireless charging transmit device of the charging power required.

When controlling the first load modulation circuit 14 and the first switch 37 to form load modulation, the microcontroller unit 11 may first control the first load modulation circuit 14 to be in an on state, control the first switch 37 to be turned on, then control the first load modulation circuit 14 to be in an off state, and control the first switch 37 to be turned off. This is performed alternately.

When controlling the first load modulation circuit 14 and the first half-bridge drive circuit 131 to form load modulation, the microcontroller unit 11 may first control the first load modulation circuit 14 to be in an on state, control the first half-bridge drive circuit 131 to be grounded, then control the first load modulation circuit 14 to be in an off state, and control the first half-bridge drive circuit 131 not to be grounded. This is performed alternately.

The H-bridge drive circuit 13 may drive the third coil 25 to oscillate by using the first half-bridge drive circuit 131, to implement full-bridge rectification effect, thereby implementing wireless charging. In this case, the H-bridge drive circuit 13 is in a half-bridge drive mode. During implementation, the microcontroller unit 11 may control the first half-bridge drive circuit 131 to be alternately connected to the power supply end or be grounded. For details, refer to the foregoing related description. Details are not described herein. In addition, when the first half-bridge drive circuit 131 is not grounded, the first switch 37 is controlled to be turned on.

c) Wireless Charging is Implemented by Using the Second Coil 24 and the Third Coil 25.

To make the third coil 25 resonate, the microcontroller unit 11 may control the first switch 37 to keep an on state. The microcontroller unit 11 may control one of the first load modulation circuit 14 and the second load modulation circuit 15 to be regularly on or off, to form load modulation, to implement protocol communication with the wireless charging transmit device, and notify the wireless charging transmit device of the charging power required.

The H-bridge drive circuit 13 may drive the second coil 24 and the third coil 25 to oscillate by using the H-bridge drive mode. During implementation, the microcontroller unit 11 may control the first half-bridge drive circuit 131 and the second half-bridge drive circuit 132 to alternately connect to the power supply end or be grounded at a second preset frequency, so that an oscillating voltage of the coil of the wireless charging transmit device changes, to implement full-bridge rectification effect, thereby implementing wireless charging. For specific implementation, refer to the related description of Implementation 1. Details are not described herein.

2) For the Wireless Charging Transmit Mode

In this mode, after demodulating a load modulation signal, the envelope detection circuit 34 and the demodulation circuit 12 may be configured to obtain the charging power expected by the charging receive device, and the electronic device may be further triggered to adjust the transmit power of the antenna module 20.

In this implementation, the electronic device may perform reverse wireless charging by using the second coil 24 and/or the third coil 25. This is separately described as follows:

a) Reverse Wireless Charging is Performed by Using the Second Coil 24.

The electronic device may drive the second coil 24 by using the H-bridge drive circuit 13 to implement wireless charging. To avoid interference of the third coil 25, the first switch 37 may be controlled to be turned off.

In specific implementation, the H-bridge drive circuit 13 may drive the wireless charging coil 22 to oscillate by using the H-bridge drive mode, thereby implementing reverse wireless charging. During implementation, the microcontroller unit 11 may control the first half-bridge drive circuit 131 and the second half-bridge drive circuit 132 to alternately connect to the power supply end or be grounded at a second preset frequency. For specific implementation, refer to the foregoing related description. Details are not described herein.

The gating switch 35 may connect the envelope detection circuit 34 and the first point.

The electronic device may control the first load modulation circuit 14 and the second load modulation circuit 15 to be in an off state, so as to reduce power consumption.

b) Reverse Wireless Charging is Performed by Using the Third Coil 25.

The electronic device may drive the third coil 25 by using the H-bridge drive circuit 13 to implement wireless charging. To avoid interference of the second coil 24, the second half-bridge drive circuit 132 may be controlled to be in an off state.

In specific implementation, the H-bridge drive circuit 13 may drive the third coil 25 to oscillate by using the first half-bridge drive circuit 131. In this case, the H-bridge drive circuit 13 is in a half-bridge drive mode. During implementation, the microcontroller unit 11 may control the first half-bridge drive circuit 131 to be alternately connected to the power supply end or be grounded. In addition, when the first half-bridge drive circuit 131 is not grounded, the first switch 37 is controlled to be turned on. Further, the first switch 37 may be controlled to be always in an on state.

The gating switch 35 may connect the envelope detection circuit 34 and the second point.

The electronic device may control the first load modulation circuit 14 and the second load modulation circuit 15 to be in an off state, so as to reduce power consumption.

c) Reverse Wireless Charging is Performed by Using the Second Coil 24 and the Third Coil 25.

To make the third coil 25 resonate, the microcontroller unit 11 may control the first switch 37 to keep an on state. The electronic device may drive the third coil 25 and the third coil 25 by using the H-bridge drive circuit 13 to implement wireless charging.

In specific implementation, the H-bridge drive circuit 13 may drive the second coil 24 and the third coil 25 to oscillate by using the H-bridge drive mode. During implementation, the microcontroller unit 11 may control the first half-bridge drive circuit 131 and the second half-bridge drive circuit 132 to alternately connect to the power supply end or be grounded at a second preset frequency. For specific implementation, refer to the foregoing related description. Details are not described herein.

The gating switch 35 may alternately connect the envelope detection circuit 34 and the first point or connect the envelope detection circuit 34 and the second point.

The electronic device may control the first load modulation circuit 14 and the second load modulation circuit 15 to be in an off state, so as to reduce power consumption.

3) For the RFID Card Reader Mode

In this mode, the envelope detection circuit 34 and the demodulation circuit 12 may learn the card number of the RFID card after demodulating a load modulation signal.

In this implementation, the electronic device may implement card number identification by using the second coil 24 and/or the third coil 25. This is separately described as follows:

a) Card Number Identification is Implemented by Using the Second Coil 24.

To avoid interference of the third coil 25, the first switch 37 may be controlled to be turned off, and the second half-bridge drive circuit 132 is controlled to be grounded. In specific implementation, the H-bridge drive circuit 13 may be alternately connected to a power supply or be grounded by using the first half-bridge drive circuit 131, so as to drive the second coil 24 to oscillate.

The gating switch 35 may connect the envelope detection circuit 34 and the first point.

The electronic device may control the first load modulation circuit 14 and the second load modulation circuit 15 to be in an off state, so as to reduce power consumption.

b) Card Number Identification is Implemented by Using the Third Coil 25.

To avoid interference of the second coil 24, the first switch 37 may be controlled to be turned on, and the second half-bridge drive circuit 132 is controlled to be in an off state. In specific implementation, the H-bridge drive circuit 13 may be alternately connected to a power supply or be grounded by using the first half-bridge drive circuit 131, so as to drive the third coil 25 to oscillate.

The gating switch 35 may connect the envelope detection circuit 34 and the second point.

The electronic device may control the first load modulation circuit 14 and the second load modulation circuit 15 to be in an off state, so as to reduce power consumption.

c) Card Number Identification is Implemented by Using the Second Coil 24 and the Third Coil 25.

To implement dual-coil driving, the second half-bridge drive circuit 132 may be controlled to be grounded, and the first switch 37 is controlled to be turned on. The H-bridge drive circuit 13 may be alternately connected to a power supply or be grounded by using the first half-bridge drive circuit 131, so as to drive the second coil 24 and the third coil 25 to oscillate.

The gating switch 35 may alternately connect the envelope detection circuit 34 and the first point or connect the envelope detection circuit 34 and the second point, to implement data receiving in a time-sharing manner.

The electronic device may control the first load modulation circuit 14 and the second load modulation circuit 15 to be in an off state, so as to reduce power consumption.

4) For the RFID Card Simulation Mode

In this mode, the electronic device may implement RFID card simulation by using the second coil 24 and/or the third coil 25. This is separately described as follows:

a) RFID Card Simulation is Implemented by Using the Second Coil 24.

This case may be implemented in any one of the following manners:

Manner 1: The electronic device may implement card number sending by using the second load modulation circuit 15 and the first half-bridge drive circuit 131.

In this manner, to ensure that the second coil 24 can form a variable load, a loop current may be formed or a current loop may be disconnected on a path in which the second load modulation circuit 15 and the first half-bridge drive circuit 131 are located. In specific implementation, first, the second load modulation circuit 15 may be controlled to be in an on state, and the first half-bridge drive circuit 131 is controlled to be grounded. Then, the second load modulation circuit 15 is controlled to be in an off state, and/or the first half-bridge drive circuit 131 is controlled not to be grounded. This is repeated.

In this manner, the electronic device may control the first load modulation circuit 14 and the second half-bridge drive circuit 132 to be in an off state, so as to reduce power consumption and avoid interference from a wireless charging function to RFID card simulation.

Manner 2: The electronic device may implement card number sending by using the first half-bridge drive circuit 131 and the second half-bridge drive circuit 132.

In this manner, to ensure that the second coil 24 can form a variable load, a loop current may be formed or a current loop may be disconnected on a path in which the first half-bridge drive circuit 131 and the second half-bridge drive circuit 132 are located. In specific implementation, the first half-bridge drive circuit 131 may be first controlled to be grounded, and the second half-bridge drive circuit 132 is controlled to be grounded. Then, the first half-bridge drive circuit 131 is controlled not to be grounded, and/or the second half-bridge drive circuit 132 is controlled to be grounded. This is repeated.

In this manner, the electronic device may control the first load modulation circuit 14 and the second load modulation circuit 15 to be in an off state, so as to reduce power consumption.

Manner 3: The electronic device may implement card number sending by using the second load modulation circuit 15, the first half-bridge drive circuit 131, and the second half-bridge drive circuit 132.

In this manner, to ensure that the second coil 24 can form a variable load, first, the second load modulation circuit 15 may be controlled to be in an on state, the first half-bridge drive circuit 131 is controlled to be grounded, and the second half-bridge drive circuit 132 is controlled to be grounded. Then, the second load modulation circuit 15 is controlled to be in an off state, and/or the first half-bridge drive circuit 131 is controlled not to be grounded, and/or the second half-bridge drive circuit 132 is controlled not to be grounded. This is repeated.

In this manner, the electronic device may control the first load modulation circuit 14 to be in an off state, so as to reduce power consumption.

In addition, in the foregoing three implementations, the first switch may be controlled to be turned off, so as to reduce power consumption.

b) RFID Card Simulation is Implemented by Using the Third Coil 25.

This case may be implemented in any one of the following manners:

Manner 1: The electronic device may implement card number sending by using the first load modulation circuit 14 and the first half-bridge drive circuit 131.

In this manner, to ensure that the third coil 25 can form a variable load, a loop current may be formed or a current loop may be disconnected on a path in which the first load modulation circuit 14 and the first half-bridge drive circuit 131 are located. In specific implementation, first, the first load modulation circuit 14 may be controlled to be in an on state, and the first half-bridge drive circuit 131 is controlled to be grounded. Then, the first load modulation circuit 14 is controlled to be in an off state, and/or the first half-bridge drive circuit 131 is controlled not to be grounded. This is repeated.

In this manner, the electronic device may control the second load modulation circuit 15 and the second half-bridge drive circuit 132 to be in an off state, so as to reduce power consumption.

Manner 2: The electronic device may implement card number sending by using the first load modulation circuit 14 and the first switch 37.

In this manner, to ensure that the third coil 25 can form a variable load, a loop current may be formed or a current loop may be disconnected on a path in which the first load modulation circuit 14 and the first switch 37 are located. In specific implementation, first, the first load modulation circuit 14 may be controlled to be in an on state, and the first switch 37 is controlled to be turned on. Then, the first load modulation circuit 14 is controlled to be in an off state, and/or the first switch 37 is controlled to be turned off. This is repeated.

In this manner, the electronic device may control the second load modulation circuit 15, the first half-bridge drive circuit, and the second half-bridge drive circuit 132 to be in an off state, so as to reduce power consumption.

Manner 3: The electronic device may implement card number sending by using the first load modulation circuit 14, the first half-bridge drive circuit 131, and the first switch 37.

In this manner, to ensure that the third coil 25 can form a variable load, first, the first load modulation circuit 14 may be controlled to be in an on state, the first half-bridge drive circuit 131 is controlled to be grounded, and the first switch 37 is controlled to be turned on. Then, the first load modulation circuit 14 is controlled to be in an off state, and/or the first half-bridge drive circuit 131 is controlled not to be grounded, and/or the first switch 37 is controlled to be turned off. This is repeated.

In this manner, the electronic device may control the second load modulation circuit 15 and the second load modulation circuit 15 to be in an off state, so as to reduce power consumption.

c) RFID Card Simulation is Implemented by Using the Second Coil 24 and the Third Coil 25.

In this case, the electronic device may implement card number sending by using the first load modulation circuit 14, the second load modulation circuit 15, and the first half-bridge drive circuit 131.

In specific implementation, the electronic device may first control the first load modulation circuit 14 and the second load modulation circuit 15 to be in an on state, and the first half-bridge drive circuit 131 is controlled to be grounded, so as to form a current loop between the second coil 24 and the third coil 25. Then, the first load modulation circuit 14 is controlled to be in an off state, and/or the second load modulation circuit 15 is controlled to be in an off state, and/or the first half-bridge drive circuit 131 is controlled not to be grounded. This is repeated, so that a current is drawn for a coil of an access controller to form a load, and card number sending can be performed.

The electronic device may control the second half-bridge drive circuit 132 to be in an off state, and control the first switch 37 to be turned off, so as to reduce power consumption.

Implementation 4

Figure 6:
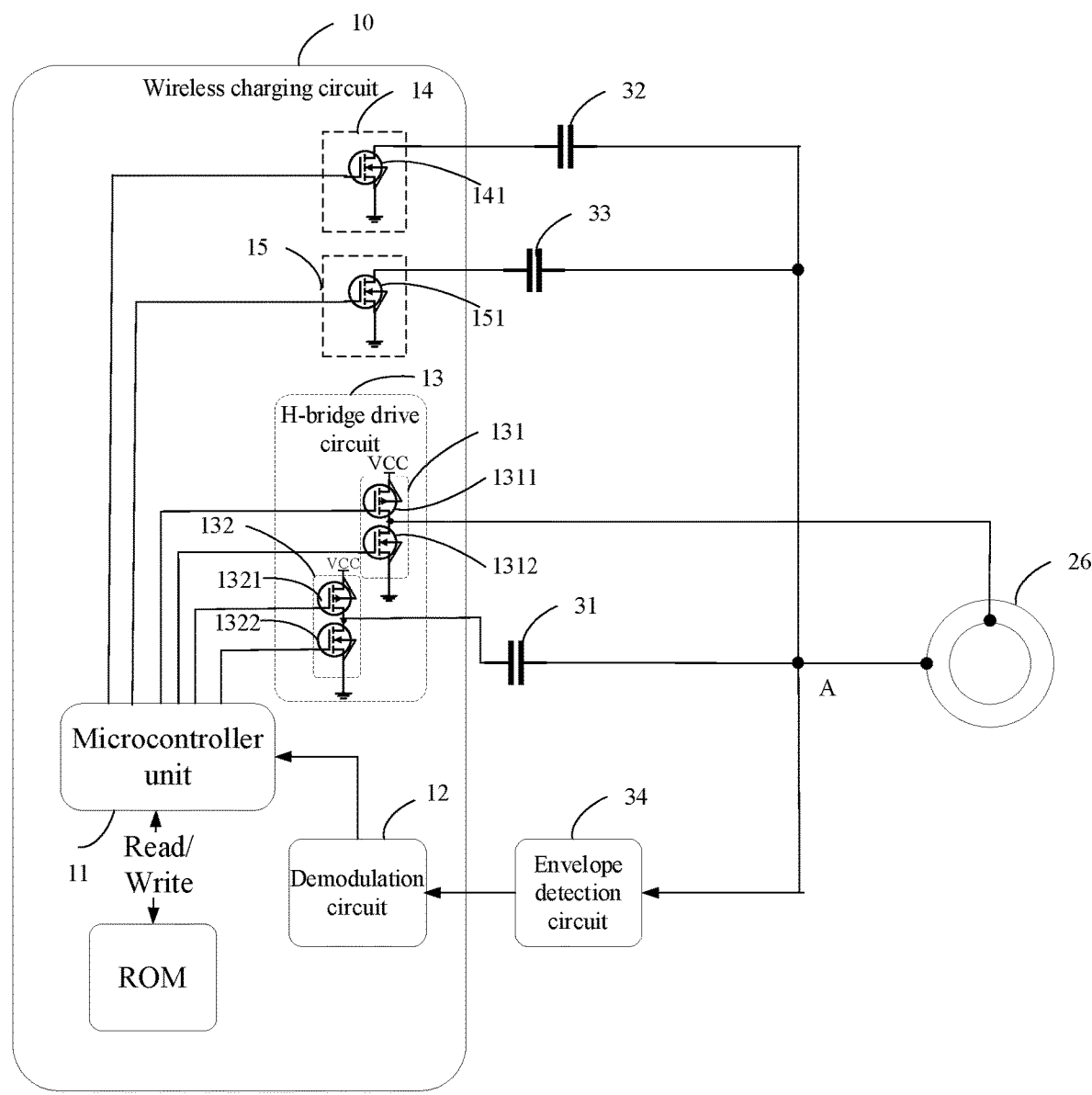
FIG. 6 is a fifth structural diagram of an electronic device according to an embodiment of this application.

As shown in FIG. 6, optionally, the antenna module 20 may include a fourth coil 26.

A first end of the fourth coil 26 is electrically connected to the second half-bridge drive circuit 132 by using the first resonant capacitor 31, and a second end of the fourth coil 26 is electrically connected to the first half-bridge drive circuit 131.

The envelope detection circuit 34 is electrically connected to a first point, and the first point is a common point between the first resonant capacitor 31 and the first end of the fourth coil.

The first load modulation circuit 14 is electrically connected to the first point by using the first load modulation capacitor 32.

The second load modulation circuit 15 is electrically connected to the first point by using the second load modulation capacitor 33.

In this implementation, the fourth coil 26 may be configured to implement wireless charging, implement reverse wireless charging, and implement card number sending. The RFID identification technology and the wireless charging technology are implemented by using a same coil.

The first load modulation circuit 14 may be configured to send a card number. The second load modulation circuit 15 is configured to implement protocol communication with the wireless charging transmit device. Therefore, the first load modulation capacitor 32 connected to the first load modulation circuit 14 may be referred to as an RFID load modulation capacitor, and the second load modulation capacitor 33 connected to the second load modulation circuit 15 may be referred to as a wireless charging load modulation capacitor.

It can be learned that in Implementation 1, a wireless charging circuit, the coil, and the matching circuit are completely shared, so that the electronic device supports the RFID identification technology and the wireless charging technology.

The following describes operating states of the electronic device in different operating modes.

1) For the Wireless Charging Receive Mode

In this mode, the electronic device may perform protocol communication with the wireless charging transmit device by using the second load modulation circuit 15, and may drive the fourth coil 26 by using the H-bridge drive circuit 13 to implement wireless charging.

In specific implementation, the electronic device may control the first load modulation circuit 14 to be in an off state, so as to reduce power consumption. The electronic device may control the second load modulation circuit 15 to be in an on state or an off state alternately according to a first preset frequency, so as to perform protocol communication with the wireless charging transmit device.

The H-bridge drive circuit 13 may drive the fourth coil 26 to oscillate by using the H-bridge drive mode, to implement full-bridge rectification effect, thereby implementing wireless charging.

During implementation, the microcontroller unit 11 may control the first half-bridge drive circuit 131 and the second half-bridge drive circuit 132 to alternately connect to the power supply end or be grounded at a second preset frequency, so as to form a reciprocal oscillating current, so that an oscillating voltage of the coil of the wireless charging transmit device changes, to implement full-bridge rectification effect, thereby implementing wireless charging. For specific implementation, refer to the foregoing related description. Details are not described herein.

2) For the Wireless Charging Transmit Mode

In this mode, the electronic device may drive the fourth coil 26 by using the H-bridge drive circuit 13 to implement wireless charging. In specific implementation, the H-bridge drive circuit 13 may drive the wireless charging coil 22 to oscillate by using the H-bridge drive mode, thereby implementing reverse wireless charging. During implementation, the microcontroller unit 11 may control the first half-bridge drive circuit 131 and the second half-bridge drive circuit 132 to alternately connect to the power supply end or be grounded at a second preset frequency. For specific implementation, refer to the foregoing related description. Details are not described herein.

The electronic device may control the first load modulation circuit 14 and the second load modulation circuit 15 to be in an off state, so as to reduce power consumption.

3) For the RFID Card Reader Mode

In this mode, the electronic device may drive the fourth coil 26 by using the H-bridge drive circuit 13 to implement card number identification of the RFID card. In specific implementation, the microcontroller unit 11 may control the first half-bridge drive circuit 131 to alternately connect to the power supply end or be grounded, and control the second half-bridge drive circuit 132 to be grounded, to implement driving of the fourth coil 26.

The electronic device may control the first load modulation circuit 14 and the second load modulation circuit 15 to be in an off state, so as to reduce power consumption.

4) For the RFID Card Simulation Mode

This mode may be implemented in any one of the following manners:

Manner 1: The electronic device may implement card number sending by using the first load modulation circuit 14 and the first half-bridge drive circuit 131.

In this manner, to ensure that the fourth coil 26 can form a variable load, a loop current may be formed or a current loop may be disconnected on a path in which the first load modulation circuit 14 and the first half-bridge drive circuit 131 are located. In specific implementation, first, the first load modulation circuit 14 may be controlled to be in an on state, and the first half-bridge drive circuit 131 is controlled to be grounded. Then, the first load modulation circuit 14 is controlled to be in an off state, and/or the first half-bridge drive circuit 131 is controlled not to be grounded. This is repeated.

In this manner, the electronic device may control the second load modulation circuit 15 and the second half-bridge drive circuit 132 to be in an off state, so as to reduce power consumption.

Manner 2: The electronic device may implement card number sending by using the second load modulation circuit 15 and the first half-bridge drive circuit 131.

In this manner, to ensure that the fourth coil 26 can form a variable load, a loop current may be formed or a current loop may be disconnected on a path in which the second load modulation circuit 15 and the first half-bridge drive circuit 131 are located. In specific implementation, first, the second load modulation circuit 15 may be controlled to be in an on state, and the first half-bridge drive circuit 131 is controlled to be grounded. Then, the second load modulation circuit 15 is controlled to be in an off state, and/or the first half-bridge drive circuit 131 is controlled not to be grounded. This is repeated.

In this manner, the electronic device may control the first load modulation circuit 14 and the second half-bridge drive circuit 132 to be in an off state, so as to reduce power consumption.

Manner 3: The electronic device may implement card number sending by using the first half-bridge drive circuit 131 and the second half-bridge drive circuit 132.

In this manner, to ensure that the fourth coil 26 can form a variable load, a loop current may be formed or a current loop may be disconnected on a path in which the first half-bridge drive circuit 131 and the second half-bridge drive circuit 132 are located. In specific implementation, the first half-bridge drive circuit 131 may be first controlled to be grounded, and the second half-bridge drive circuit 132 is controlled to be grounded. Then, the first half-bridge drive circuit 131 is controlled not to be grounded, and/or the second half-bridge drive circuit 132 is controlled to be grounded. This is repeated.

In this manner, the electronic device may control the first load modulation circuit 14 and the second load modulation circuit 15 to be in an off state, so as to reduce power consumption.

Manner 4: The electronic device may implement card number sending by using the first load modulation circuit 14, the second load modulation circuit 15, the first half-bridge drive circuit 131, and the second half-bridge drive circuit 132.

In this manner, to ensure that the fourth coil 26 can form a variable load, first, the first load modulation circuit 14 may be controlled to be in an on state, the second load modulation circuit 15 is controlled to be in an on state, the first half-bridge drive circuit 131 is controlled to be grounded, and the second half-bridge drive circuit 132 is controlled to be grounded. Then, the first load modulation circuit 14 is controlled to be in an off state, the second load modulation circuit 15 is controlled to be in an off state, the first half-bridge drive circuit 131 is controlled not to be grounded, and/or the second half-bridge drive circuit 132 is controlled to be grounded. This is repeated.

In this embodiment of this application, as shown in FIG. 3 to FIG. 6, optionally, the first load modulation circuit 14 includes a first field effect MOS transistor 141, and the second load modulation circuit 15 includes a second MOS transistor 151.

The first MOS transistor 141 and the second MOS transistor 151 are N-type MOS transistors.

A gate of the first MOS transistor 141 is electrically connected to the microcontroller unit, a drain of the first MOS transistor 141 is electrically connected to the first load modulation capacitor 32, and a source of the first MOS transistor 141 is grounded.

A gate of the second MOS transistor 151 is electrically connected to the microcontroller unit, a drain of the second MOS transistor 151 is electrically connected to the second load modulation capacitor 33, and a source of the second MOS transistor 151 is grounded.

In a case that the first load modulation circuit 14 is in an on state, the first MOS transistor 141 is turned on.

In a case that the first load modulation circuit 14 is in an off state, the first MOS transistor 141 is turned off.

In a case that the second load modulation circuit 15 is in an on state, the second MOS transistor 151 is turned on.

In a case that the second load modulation circuit 15 is in an off state, the second MOS transistor 151 is turned off.

Optionally, the first half-bridge drive circuit 131 includes a third MOS transistor 1311 and a fourth MOS transistor 1312, and the second half-bridge drive circuit 132 includes a fifth MOS transistor 1321 and a sixth MOS transistor 1322.

The third MOS transistor 1311 and the fifth MOS transistor 1321 are P-type MOS transistors, and the fourth MOS transistor 1312 and the sixth MOS transistor 1322 are N-type MOS transistors.

Gates of the third MOS transistor 1311, the fourth MOS transistor 1312, the fifth MOS transistor 1321, and the sixth MOS transistor 1322 are each electrically connected to the microcontroller unit 11, sources of the third MOS transistor 1311 and the fifth MOS transistor 1321 are each electrically connected to the power supply end, a drain of the third MOS transistor 1311 is electrically connected to a drain of the fourth MOS transistor 1312, a drain of the fifth MOS transistor 1321 is electrically connected to a drain of the sixth MOS transistor 1322, and sources of the fourth MOS transistor 1312 and the sixth MOS transistor 1322 are each grounded.

A third point and a fourth point are each electrically connected to the antenna module 20, the third point is a common point between the drain of the third MOS transistor 1311 and the drain of the fourth MOS transistor 1312, and the fourth point is a common point between the drain of the fifth MOS transistor 1321 and the drain of the sixth MOS transistor 1322.

In a case that the first half-bridge drive circuit 131 is connected to the power supply end but is not grounded, the third MOS transistor 1311 may be turned on, and the fourth MOS transistor 1312 may be turned off. In a case that the first half-bridge drive circuit 131 is not connected to the power supply end but is grounded, the third MOS transistor 1311 may be turned off, and the fourth MOS transistor 1312 may be turned on. In a case that the first half-bridge drive circuit 131 is in an off state, the third MOS transistor 1311 and the fourth MOS transistor 1312 are turned off.

In a case that the first half-bridge drive circuit 131 is connected to the power supply end but is not grounded, the fifth MOS transistor 1321 may be turned on, and the sixth MOS transistor 1322 may be turned off. In a case that the first half-bridge drive circuit 131 is not connected to the power supply end but is grounded, the fifth MOS transistor 1321 may be turned off, and the sixth MOS transistor 1322 may be turned on. In a case that the first half-bridge drive circuit 131 is in an off state, the fifth MOS transistor 1321 and the sixth MOS transistor 1322 are turned off.

It should be noted that, in some implementations, the half-bridge drive circuit may alternatively be formed by using another switch. This may be specifically determined according to an actual situation, and is not limited in this embodiment of this application. In addition, the first switch 37 in FIG. 3 is also represented as a MOS transistor. However, in another implementation, the first switch 37 may alternatively be a switch in another form, such as a single-pole double-throw switch.

Figure 7:
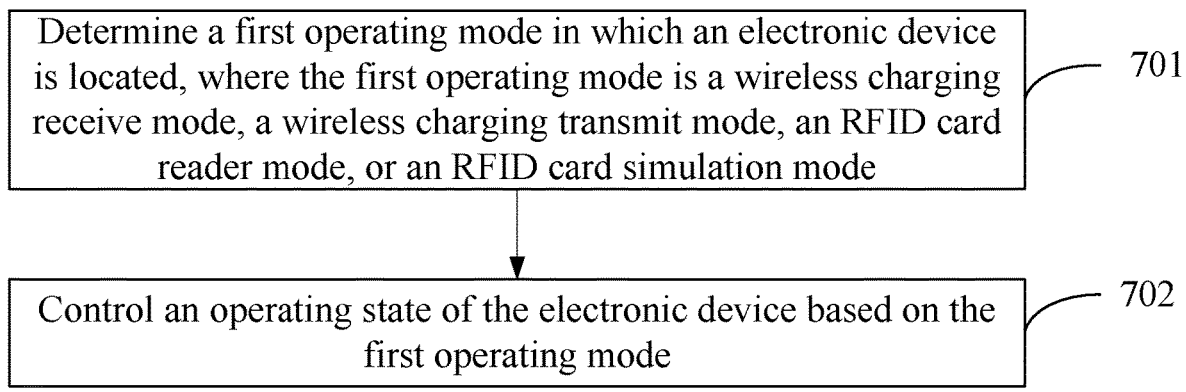
FIG. 7 is a flowchart of a control method according to an embodiment of this application.

FIG. 7 is a flowchart of a control method according to an embodiment of this application. As shown in FIG. 7, the control method may include the following steps:

Step 701: Determine a first operating mode in which the electronic device is located, where the first operating mode is a wireless charging receive mode, a wireless charging transmit mode, an RFID card reader mode, or an RFID card simulation mode.

Step 702: Control an operating state of the electronic device based on the first operating mode.

According to the control method in this embodiment, an operating mode of the electronic device includes a wireless charging receive mode, a wireless charging transmit mode, an RFID card reader mode, and an RFID card simulation mode, so that the electronic device implements a wireless charging function, an RFID card reader function, and an RFID card simulation function, thereby enriching functions of the electronic device.

Optionally, the first load modulation circuit includes the first MOS transistor, and the second load modulation circuit includes the second MOS transistor.

The first half-bridge drive circuit includes the third MOS transistor and the fourth MOS transistor, and the second half-bridge drive circuit includes the fifth MOS transistor and the sixth MOS transistor.

Optionally, the first operating mode is a wireless charging receive mode; and the controlling an operating state of the electronic device based on the first operating mode includes:

in a case that the antenna module includes the RFID coil and the wireless charging coil, turning off the first MOS transistor, turning on or off the second MOS transistor at a first preset frequency, and turning on or off a first target MOS transistor and a second target MOS transistor alternately at a second preset frequency; or in a case that the antenna module includes the first coil, turning off the first MOS transistor and the first switch, turning on or off the second MOS transistor at a first preset frequency, and turning on or off a first target MOS transistor and a second target MOS transistor alternately at a second preset frequency; or in a case that the antenna module includes the second coil and the third coil, turning off the first MOS transistor and the first switch, turning on or off a first target MOS transistor and a second target MOS transistor alternately at a second preset frequency, and controlling an operating state of the second MOS transistor to be the same as an operating state of the fourth MOS transistor; or turning off the fifth MOS transistor and the sixth MOS transistor, turning on or off the third MOS transistor and the fourth MOS transistor alternately at a second preset frequency, controlling the first switch to be turned on when the third MOS transistor is turned on, and controlling an operating state of the first MOS transistor to be the same as an operating state of the fourth MOS transistor or the first switch; or turning on the first switch, turning on or off a third target MOS transistor at a first preset frequency, and turning on or off a first target MOS transistor and a second target MOS transistor alternately at a second preset frequency; or in a case that the antenna module includes the fourth coil, turning off the first MOS transistor, turning on or off the second MOS transistor at a first preset frequency, and turning on or off a first target MOS transistor and a second target MOS transistor alternately at a second preset frequency, where the first target MOS transistor includes the third MOS transistor and the sixth MOS transistor, the second target MOS transistor includes the fourth MOS transistor and the fifth MOS transistor, and the third target MOS transistor is the first MOS transistor or the second MOS transistor.

Optionally, the first operating mode is a wireless charging transmit mode; and the controlling an operating state of the electronic device based on the first operating mode includes:

in a case that the antenna module includes the RFID coil and the wireless charging coil, turning off the first MOS transistor and the second MOS transistor, turning on or off a first target MOS transistor and a second target MOS transistor alternately at a second preset frequency, and controlling the gating switch to connect the envelope detection circuit and the first point; or in a case that the antenna module includes the first coil, turning off the first MOS transistor, the second MOS transistor, and the first switch, turning on or off a first target MOS transistor and a second target MOS transistor alternately at a second preset frequency, and controlling the gating switch to connect the envelope detection circuit and the first point; or in a case that the antenna module includes the second coil and the third coil, turning off the first MOS transistor, the second MOS transistor, and the first switch, turning on or off a first target MOS transistor and a second target MOS transistor alternately at a second preset frequency, and controlling the gating switch to connect the envelope detection circuit and the first point; or turning off the first MOS transistor, the second MOS transistor, the fifth MOS transistor, and the sixth MOS transistor, turning on or off the third MOS transistor and the fourth MOS transistor alternately at a second preset frequency, controlling the first switch to be turned on when the third MOS transistor is turned on, and controlling the gating switch to connect the envelope detection circuit and the second point; or turning off the first MOS transistor and the second MOS transistor, turning on the first switch, turning on or off a first target MOS transistor and a second target MOS transistor alternately at a second preset frequency, and controlling the gating switch to alternately connect the envelope detection circuit and the first point or connect the envelope detection circuit and the second point; or in a case that the antenna module includes the fourth coil, turning off the first MOS transistor and the second MOS transistor, and turning on or off a first target MOS transistor and a second target MOS transistor alternately at a second preset frequency, where the first target MOS transistor includes the third MOS transistor and the sixth MOS transistor, and the second target MOS transistor includes the fourth MOS transistor and the fifth MOS transistor.

Optionally, the first operating mode is an RFID card reader mode; and the controlling an operating state of the electronic device based on the first operating mode includes:

in a case that the antenna module includes the RFID coil and the wireless charging coil, turning off the first MOS transistor, the second MOS transistor, the fifth MOS transistor, and the sixth MOS transistor, and turning on or off the third MOS transistor and the fourth MOS transistor alternately at a second preset frequency; or in a case that the antenna module includes the first coil, turning off the first MOS transistor, the second MOS transistor, the fifth MOS transistor, and the sixth MOS transistor, turning on the first switch, turning on or off the third MOS transistor and the fourth MOS transistor alternately at a second preset frequency, and controlling the gating switch to connect the envelope detection circuit and the second point; or in a case that the antenna module includes the second coil and the third coil, turning off the first MOS transistor, the second MOS transistor, the fifth MOS transistor, and the first switch, turning on the sixth MOS transistor, turning on or off the third MOS transistor and the fourth MOS transistor alternately at a second preset frequency, and controlling the gating switch to connect the envelope detection circuit and the first point; or turning off the first MOS transistor, the second MOS transistor, the fifth MOS transistor, and the sixth MOS transistor, turning on the first switch, turning on or off the third MOS transistor and the fourth MOS transistor alternately at a second preset frequency, and controlling the gating switch to connect the envelope detection circuit and the second point; or turning on or off the third MOS transistor and the fourth MOS transistor alternately at a second preset frequency, turning on the sixth MOS transistor and the first switch, turning off the first MOS transistor, the second MOS transistor, and the fifth MOS transistor, and controlling the gating switch to alternately connect the envelope detection circuit and the first point or connect the envelope detection circuit and the second point; or in a case that the antenna module includes the fourth coil, turning off the first MOS transistor, the second MOS transistor, and the fifth MOS transistor, turning on the sixth MOS transistor, and turning on or off the third MOS transistor and the fourth MOS transistor alternately at a second preset frequency.

Optionally, the first operating mode is an RFID card simulation mode; and the controlling an operating state of the electronic device based on the first operating mode includes:

in a case that the antenna module includes the RFID coil and the wireless charging coil, turning on or off the first MOS transistor and the fourth MOS transistor alternately at a third preset frequency, and turning off another MOS transistor; or keeping the first MOS transistor on, turning on or off the fourth MOS transistor alternately at a third preset frequency, and turning off another MOS transistor; or keeping the fourth MOS transistor on, turning on or off the first MOS transistor alternately at a third preset frequency, and turning off another MOS transistor; or in a case that the antenna module includes the first coil, turning on or off the first MOS transistor and the fourth MOS transistor alternately at a third preset frequency, and turning off another MOS transistor and the first switch; or turning on or off a fourth switch and the first switch alternately at a third preset frequency, and turning off another MOS transistor; or turning on or off the first MOS transistor, the fourth MOS transistor, and the first switch alternately at a third preset frequency, and turning off another MOS transistor; or in a case that the antenna module includes the second coil and the third coil, turning on or off the second MOS transistor and the fourth MOS transistor alternately at a third preset frequency, and turning off another MOS transistor and the first switch; or turning on or off the fourth MOS transistor and the sixth MOS transistor alternately at a third preset frequency, and turning off another MOS transistor and the first switch; or turning on or off the second MOS transistor, the fourth MOS transistor, and the sixth MOS transistor alternately at a third preset frequency, and turning off another MOS transistor and the first switch; or turning on or off the first MOS transistor and the fourth MOS transistor alternately at a third preset frequency, and turning off another MOS transistor and the first switch; or turning on or off a fourth switch and the first switch alternately at a third preset frequency, and turning off another MOS transistor; or turning on or off the first MOS transistor, the fourth MOS transistor, and the first switch alternately at a third preset frequency, and turning off another MOS transistor; or turning on or off the first MOS transistor, the second MOS transistor, and the fourth MOS transistor alternately at a third preset frequency, and turning off another MOS transistor and the first switch; or in a case that the antenna module includes the fourth coil, turning on or off the first MOS transistor and the fourth MOS transistor alternately at a third preset frequency, and turning off another MOS transistor; or turning on or off the second MOS transistor and the sixth MOS transistor alternately at a third preset frequency, and turning off another MOS transistor; or turning on or off the fourth MOS transistor and the sixth MOS transistor alternately at a third preset frequency, and turning off another MOS transistor; or turning on or off the first MOS transistor, the second MOS transistor, the fourth MOS transistor, and the sixth MOS transistor alternately at a third preset frequency, and turning off another MOS transistor.

It should be noted that when the first operating mode is that the first operating mode is a wireless charging receive mode, a wireless charging transmit mode, an RFID card reader mode, or an RFID card simulation mode, for an operating state of each component of the electronic device, refer to the foregoing related description. Details are not described herein.

In the wireless charging receive mode and the RFID card simulation mode, the gating switch may be in an off state to reduce power consumption.

The plurality of optional implementations described in the embodiments of this application may be implemented in combination with each other without conflict, or may be separately implemented. This is not limited in the embodiments of this application.

For ease of understanding, example descriptions are as follows:

Principle of this application: In this application, wireless charging IC hardware is shared, wireless charging IC internal software, that is, a control logic of an MCU, is modified, and a 125K low-frequency RFID antenna and a matching path thereof are added, so that a wireless charging function and a 125K low-frequency access control function are simultaneously implemented in a case of a single wireless charging IC.

Specific Innovations:
  (1) A part of a wireless charging circuit is shared, to simultaneously implement wireless charging and the 125K RFID technology, and a hardware part that is shared is not limited to all or a part of the IC, an antenna, a matching circuit, or the like.
  (2) A plurality of functions may be implemented by using not only a single IC.
  (3) An external common circuit may be implemented in a plurality of manners to improve performance and implement mutual non-interference.

The electronic device in this application mainly includes a wireless charging IC, a wireless charging antenna, and a 125K low-frequency RFID antenna.

The wireless charging IC implements driving of a wireless charging coil, wireless charging energy transmitting and receiving, driving of a 125K low-frequency RFID coil, and signal detecting and receiving, and implements wireless charging and a 125K low-frequency RFID function in a time-sharing manner or simultaneously.

The wireless charging antenna implements energy and protocol information transmission and receiving during wireless charging.

The 125K low-frequency RFID antenna implements a low-frequency RFID function. The antenna may be shared with the wireless charging antenna in a part of Embodiment 1.

A design in this application is based on a difference in a shared hardware part in this application, and there are a plurality of embodiments, which may be implemented through turn-on, turn-off, and periodic turn-on and turn-off of the first MOS transistor to the sixth MOS transistor in different operating modes. For a specific embodiment, refer to the following.

In the embodiments of the present application, the antenna, the coil, and the antenna coil may be interchanged.

Embodiment 1: A wireless charging IC is shared, and an antenna is independently designed.

As shown in FIG. 3, a wireless charging IC is shared, and a wireless charging antenna is separated from a 125K low-frequency RFID antenna and a matching circuit by independent design.

Connection Manner Description:
  A first half-bridge drive circuit (that is, a third MOS transistor and a fourth MOS transistor) of a coil drive circuit is connected to a common drive terminal of the two antennas;
  a second half-bridge drive circuit (that is, a fifth MOS transistor and a sixth MOS transistor) of the coil drive circuit is connected to another terminal of a wireless charging antenna by using a resonant capacitor, where the resonant capacitor may be formed by one or more combinations;

a first load modulation circuit (that is, a first MOS transistor) is capacitively connected to two terminals of the 125K antenna; and a second load modulation circuit (that is, a second MOS transistor) is capacitively connected to two terminals of the wireless charging antenna.

The apparatus has four operating modes:

(1) Wireless charging receive mode: The wireless charging antenna induces a voltage to wake up a wireless charging IC. The wireless charging IC implements load modulation by using a "wireless charging load modulation circuit" and implements protocol communication with a wireless charging base, to implement charging.

MOS transistor switching description: The first MOS transistor is turned off (because 125K card simulation does not need to be performed), the second MOS transistor is regularly turned on or off (required for a wireless charging protocol communication function), and the third MOS transistor to the sixth MOS transistor are regularly turned on or off at a carrier frequency, to implement full-bridge rectification effect, thereby implementing wireless charging.

(2) Reverse wireless charging mode: The coil drive circuit drives the wireless charging antenna to oscillate and emit energy. A corresponding receive device draws energy through load modulation, so that an oscillating voltage of a coil at a transmit end changes. In this case, an "envelope detection circuit" and an "internal demodulation circuit" implement demodulation of a load modulation signal, and then send a corresponding power according to a requirement of the other party.

MOS transistor switching description: The first MOS transistor is turned off (because 125K card simulation does not need to be performed), the second MOS transistor is turned off (which is not required by the wireless charging transmit end), and the third MOS transistor to the sixth MOS transistor are regularly turned on or off at a carrier frequency, so as to drive the coil to implement reverse wireless charging. A gating switch needs to be switched to a wireless charging end.

(3) 125K low-frequency RFID card reader mode: Similar to the foregoing (2) reverse wireless charging mode, the coil drive circuit drives the 125K low-frequency RFID antenna to oscillate, an RFID card tag is energized to start after approaching a coil, and draws energy through load modulation, so that an oscillating voltage of a coil at a transmit end changes. In this case, an "envelope detection circuit" and an "internal demodulation circuit" implement demodulation of a load modulation signal, and then learn card number information of the RFID card tag approaching.

MOS transistor switching description: The first MOS transistor, the second MOS transistor, the fifth MOS transistor, and the sixth MOS transistor are all turned off, and the third MOS transistor and the fourth MOS transistor are turned on and off at a preset frequency, such as 125 KHZ or 134.2 KHZ, to implement driving of a 125K coil. A gating switch needs to be switched to a low-frequency RFID antenna path.

(4) 125K low-frequency RFID card simulation mode: After it is detected that a card reader is approaching, a load modulation module inside the wireless charging IC implements load modulation by turning on or turning off a "125K low-frequency RFID load modulation circuit", and finally implements card number sending.

There are two implementations for drawing a current for the RFID coil to form a load herein:

Manner 1: A current path is implemented by using a 125K resonant capacitor and the first MOS transistor.

Manner 2: The first MOS transistor and the fourth MOS transistor are simultaneously turned on to implement a current path.

In Manner 1 or Manner 2, a current may be formed on an RFID coil or a current may not be formed when the path is disconnected, so as to implement a change of a load formed by a primary coil (that is, a coil of a card reader), and implement data sending.

In addition to the MOS transistors described in Manner 1 and Manner 2, other MOS transistors need to be in an off state to avoid interference.

In this case, a current may be drawn to form a load in a manner in which the first MOS transistor and the fourth MOS transistor are turned on.

Embodiment 2: The wireless charging IC is shared, and the wireless charging coil and the RFID coil are partially shared.

Similar to Embodiment 1, the apparatus also has four operating modes, and a difference lies in that a special antenna design of the apparatus and a first switch is added to control the RFID antenna to be grounded, to reduce impact.

In Embodiment 1, the wireless charging antenna and the RFID antenna are partially shared, which is a hybrid antenna technology, as shown in FIG. 4. The coil has three taps that are respectively a common drive terminal of the two antennas, a WPC terminal, and an RFID terminal. The common drive terminal of the two antennas is jointly connected to a first half-bridge drive circuit of the wireless charging IC, and the WPC terminal is a central tap of the coil, and is connected to a second half-bridge drive circuit by using a wireless charging resonant capacitor. The RFID terminal is an end of a hybrid coil, has a highest inductance value, and is grounded by the first switch and a resonant capacitor. This design is similar to Embodiment 1, but a nested design of the coil causes partial sharing of the coil, that is, only a part of the coil is used during wireless charging, and all of the coil is used during RFID communication.

Similar to Embodiment 1, the apparatus has four operating modes:

(1) Wireless charging receive mode: The wireless charging antenna induces a voltage to wake up a wireless charging IC. The wireless charging IC implements load modulation by using a "wireless charging communication load modulation control circuit" and implements protocol communication with a wireless charging base, to implement charging.

MOS transistor switching description: The first MOS transistor is turned off (because 125K card simulation does not need to be performed), the first switch is turned off (to prevent a wireless charging function being affected when the two coils resonate at the same time), the second MOS transistor is regularly turned on or off (required for a wireless charging protocol communication function), and the third MOS transistor to the sixth MOS transistor are regularly turned on or off at a carrier frequency, to implement full-bridge rectification effect, thereby implementing wireless charging.

(2) Reverse wireless charging mode: The coil drive circuit drives the wireless charging antenna to oscillate and emit energy. A corresponding receive device draws energy through load modulation, so that an oscillating voltage of a coil at a transmit end changes. In this case, an "envelope detection circuit" and an "internal demodulation circuit" implement demodulation of a load modulation signal, and then send a corresponding power according to a requirement of the other party.

MOS transistor switching description: The first MOS transistor is turned off (because 125K card simulation does not need to be performed), the first switch is turned off (to prevent a wireless charging function being affected when the two coils resonate at the same time), a gating switch at a front end of an envelope detection circuit is switched to a wireless charging path, the second MOS transistor is turned off (which is not required by the wireless charging transmit end), and the third MOS transistor to the sixth MOS transistor are regularly turned on or off at a carrier frequency, so as to drive the coil to implement reverse wireless charging. The gating switch needs to be switched to the wireless charging path through gating switch control, to receive data.

(3) 125K low-frequency RFID card reader mode: Similar to the foregoing (2) reverse wireless charging mode, the coil drive circuit drives the 125K low-frequency RFID antenna to oscillate, an RFID card tag is energized to start after approaching a coil, and draws energy through load modulation, so that an oscillating voltage of a coil at a transmit end changes. In this case, an "envelope detection circuit" and an "internal demodulation circuit" implement demodulation of a load modulation signal, and then learn card number information of the RFID card tag approaching.

MOS transistor switching description: The first MOS transistor, the second MOS transistor, the fifth MOS transistor, and the sixth MOS transistor are all turned off, the first switch is turned on, and the third MOS transistor and the fourth MOS transistor are turned on and off at a frequency of about 125 KHZ, so as to drive the 125K coil, and switch the gating switch at the front end of the envelope detection circuit to a 125K path, so as to implement a card reader function. In this case, the gating switch needs to be switched to an RFID path through gating switch control, to receive data.

(4) 125K low-frequency RFID card simulation mode: After it is detected that a card reader is approaching, a load modulation module inside the wireless charging IC implements load modulation by turning on or turning off a "125K low-frequency RFID load modulation circuit", and finally implements card number sending. To form a current in an entire coil, there are three implementations: Manner 1: A current is drawn to form a load in a manner in which the first MOS transistor and the fourth MOS transistor are turned on. Manner 2: A current is drawn to form a load in a manner in which the first MOS transistor and the first switch are turned on. Manner 3: A current is drawn to form a load in a manner in which the first MOS transistor, the fourth MOS transistor, and the first switch are turned on.

Whether it is turn-on or not in the foregoing three manners can control whether a current is formed on the coil, that is, a load change is formed on a transmitting primary coil, that is, a coil of an access controller or a card reader, to implement data sending. In addition to the foregoing transistors, other switches, such as the MOS transistor and/or the first switch, need to be in an off state, to avoid impact.

Embodiment 3: Dual-coil antenna design.

The apparatus is similar to that in Embodiment 1, and a main change lies in:

A first antenna and a second antenna are completely independent and need to be arranged separately.

On the basis of Embodiment 1, the functions are implemented without distinction, and functions of two wireless charging antennas and two RFID antennas, or one RFID antenna and one wireless charging antenna can be implemented.

In contrast to Embodiment 1, the first switch for controlling whether a resonant capacitor of the second antenna is grounded is added, which can implement separate control on whether two coils resonate. The apparatus has a plurality of operating modes:

(1) Single-antenna wireless charging receive mode: The wireless charging antenna induces a voltage to wake up a wireless charging IC. The wireless charging IC implements load modulation by using a "wireless charging communication load modulation control circuit" and implements protocol communication with a wireless charging base, to implement charging.

There are two cases of the single-antenna receive mode, that is, the first antenna and the second antenna.

When wireless charging is implemented by using the first antenna, the first MOS first switch of the second antenna is first turned off to avoid interference. The fourth transistor and the second MOS transistor are turned on or off simultaneously, to form load modulation, and a charging power required by the other party is notified. Then, energy is received. When receiving energy, the third MOS transistor to the sixth MOS transistor are periodically turned on to perform energy receiving.

When wireless charging is implemented by the second antenna, the fifth MOS transistor and the sixth MOS transistor are first turned off, so as to avoid interference of the first antenna. The first MOS transistor and the first switch are turned on or off simultaneously, so that load modulation may be formed (similarly, this may alternatively be implemented by turning on or off the first MOS transistor and the fourth MOS transistor simultaneously), and a power required by the other party is notified. In an energy receiving phase, the third MOS transistor and the fourth MOS transistor are discontinuously turned on or off, so that energy is received. When the third MOS transistor is turned on, the first switch is turned on.

(2) Dual-antenna wireless charging receive mode: The wireless charging antenna induces a voltage to wake up a wireless charging IC. The wireless charging IC implements load modulation by using a "wireless charging communication load modulation control circuit" and implements protocol communication with a wireless charging base, to implement charging.

MOS transistor switching description: The first switch is turned on (to implement resonance of the second antenna), one of the first MOS transistor or the second MOS transistor is regularly turned on or off (required for a wireless charging protocol communication function), and the third MOS transistor to the sixth MOS transistor are regularly turned on or off at a carrier frequency, to implement full-bridge rectification effect, thereby implementing wireless charging.

(3) Single-antenna reverse wireless charging mode: The coil drive circuit drives the wireless charging antenna to oscillate and emit energy. A corresponding receive device draws energy through load modulation, so that an oscillating voltage of a coil at a transmit end changes. In this case, an "envelope detection circuit" and an "internal demodulation circuit" implement demodulation of a load modulation signal, and then send a corresponding power according to a requirement of the other party.

In implementation, the first antenna or the second antenna may be separately used for reverse wireless charging.

When the first antenna is used, the first MOS transistor, the second MOS transistor, and the first switch are turned off, the gating switch is switched to the first antenna, and the third MOS transistor to the sixth MOS transistor drive the first antenna to oscillate. After a power required by the other party is detected, a duty cycle of the third MOS transistor to the sixth MOS transistor may be adjusted to adjust the power, thereby implementing reverse wireless charging.

When the second antenna is used, the first MOS transistor, the second MOS transistor, the fifth MOS transistor, and the sixth MOS transistor are turned off, so as to avoid impact of the first antenna. The gating switch is switched to the second antenna, and the third MOS transistor and the fourth MOS transistor are discontinuously connected to form a drive. After power information required by the other party is obtained, a turn-on duty cycle of the third MOS transistor and the fourth MOS transistor may be adjusted to adjust the transmit power, so as to implement wireless charging transmitting. When the third MOS transistor is turned on, the first switch is turned on.

(4) Dual-antenna reverse wireless charging mode: The coil drive circuit drives the wireless charging antenna to oscillate and emit energy. A corresponding receive device draws energy through load modulation, so that an oscillating voltage of a coil at a transmit end changes. In this case, an "envelope detection circuit" and an "internal demodulation circuit" implement demodulation of a load modulation signal, and then send a corresponding power according to a requirement of the other party.

MOS transistor switching description: The first switch is turned on (to implement resonance of the second coil), and a gating switch at a front end of an envelope detection circuit is periodically switched, so as to implement receiving of data in a polling manner. The first MOS transistor and the second MOS transistor are turned on (which is not required by the wireless charging transmit end), and the gating switch is periodically switched. The third MOS transistor and the sixth MOS transistor are regularly turned on and off at a carrier frequency, so as to drive the two coils simultaneously, thereby implementing reverse wireless charging by the two coils. In this case, the receive device may be a single wireless charging receive device having two coils or two wireless charging receive devices each having a single coil.

(5) 125K low-frequency RFID card reader mode: Similar to the foregoing reverse wireless charging mode, the coil drive circuit drives the antenna to oscillate, an RFID card tag is energized to start after approaching a coil, and draws energy through load modulation, so that an oscillating voltage of a coil at a transmit end changes. In this case, an "envelope detection circuit" and an "internal demodulation circuit" implement demodulation of a load modulation signal, and then learn card number information of the RFID card tag approaching.

The card reader mode may be divided into a single-antenna mode or a dual-antenna mode, which is described in the following:

First-antenna card reader mode: The third MOS transistor and the fourth MOS transistor are discontinuously turned on to drive the first coil, and the sixth MOS transistor is continuously turned on to implement resonant capacitor grounding. The gating switch needs to be switched to the first antenna end to implement data receiving. In addition, other MOS transistors and the first switch are in an off state, to avoid interference.

Second-antenna card reader mode: The third MOS transistor and the fourth MOS transistor are discontinuously turned on to drive the second coil, and the first switch is continuously turned on to implement resonant capacitor grounding. The gating switch needs to be switched to the second antenna end to implement data receiving. In addition, other MOS transistors are in an off state, to avoid interference.

Dual-antenna card reader mode: The third MOS transistor and the fourth MOS transistor are discontinuously turned on to drive the two coils, and the sixth MOS transistor and the first switch are continuously turned on to implement resonant capacitor grounding. The gating switch needs to be switched to the first antenna end and the second antenna end in a polling manner to implement data receiving in a time-sharing manner. In addition, other MOS transistors are in an off state, to avoid interference.

(6) 125K low-frequency RFID card simulation mode: After it is detected that a card reader is approaching, a load modulation module inside the wireless charging IC implements load modulation by turning on or turning off a "125K low-frequency RFID load modulation circuit", and finally implements card number sending.

The card simulation mode may be divided into a single-antenna mode or a dual-antenna mode, which is described in the following:

First-antenna card simulation mode: There are three manners: Manner 1: A current is drawn to form a load in a manner in which the second MOS transistor and the fourth MOS transistor are turned on. Manner 2: A current is drawn to form a load in a manner in which the fourth MOS transistor and the sixth MOS transistor are turned on. Manner 3: A current is drawn to form a load in a manner in which the second MOS transistor, the fourth MOS transistor, and the sixth MOS transistor are turned on. In addition, other MOS transistors and the first switch need to be in an off state.

Second-antenna card simulation mode: There are three manners: Manner 1: A current is drawn to form a load in a manner in which the first MOS transistor and the fourth MOS transistor are turned on. Manner 2: A current is drawn to form a load in a manner in which the fourth MOS transistor and the first switch are turned on. Manner 3: A current is drawn to form a load in a manner in which the first MOS transistor, the fourth MOS transistor, and the first switch are turned on. In addition, other MOS transistors need to be in an off state.

Dual-antenna card simulation mode: The first MOS transistor, the second MOS transistor, and the fourth MOS transistor are discontinuously turned on to form a current loop between the first coil and the second coil, so that a current is drawn for a coil of an access controller to form a load, and card number sending can be performed. In addition, other MOS transistors need to be in an off state.

The foregoing function modes may be performed simultaneously by using a single or a plurality of combinations. In addition, different capacitance values may be configured on resonant capacitors of the first antenna and the second antenna to implement different resonance frequencies, so as to support wireless charging technologies and standards of a plurality of frequencies. The load modulation capacitor may be a combination of one or more capacitors, or even a resistor, to achieve a better effect.

Embodiment 4: A wireless charging IC is shared, and an antenna is completely shared.

As shown in FIG. 6, hardware such as a wireless charging IC and an antenna are shared, and one load modulation capacitor is reserved as a solution of a dedicated RFID load modulation capacitor path.

Connection Manner Description:

A first half-bridge drive circuit (a third MOS transistor and a fourth MOS transistor) is connected to a COM terminal of antennas;

a second half-bridge drive circuit (that is, a fifth MOS transistor and a sixth MOS transistor) is connected to another terminal of an antenna by using a resonant capacitor, where the resonant capacitor may be formed by one or more combinations;

a first load modulation circuit (that is, a first MOS transistor) is capacitively connected to two terminals of the antenna; and a second load modulation circuit (that is, a second MOS transistor) is capacitively connected to two terminals of the antenna.

The apparatus has four operating modes:

(1) Wireless charging receive mode: The wireless charging antenna induces a voltage to wake up a wireless charging IC. The wireless charging IC implements load modulation by using a "wireless charging communication load modulation control circuit" and implements protocol communication with a wireless charging base, to implement charging.

MOS transistor switching description: The first MOS transistor is turned off (because 125K card simulation does not need to be performed), the second MOS transistor is regularly turned on or off (required for a wireless charging protocol communication function), and the third MOS transistor to the sixth MOS transistor are regularly turned on or off at a carrier frequency, to implement full-bridge rectification effect, thereby implementing wireless charging.

(2) Reverse wireless charging mode: The coil drive circuit drives the wireless charging antenna to oscillate and emit energy. A corresponding receive device draws energy through load modulation, so that an oscillating voltage of a coil at a transmit end changes. In this case, an "envelope detection circuit" and an "internal demodulation circuit" implement demodulation of a load modulation signal, and then send a corresponding power according to a requirement of the other party.

MOS transistor switching description: The first MOS transistor is turned off (because 125K card simulation does not need to be performed), the second MOS transistor is turned off (which is not required by the wireless charging transmit end), and the third MOS transistor to the sixth MOS transistor are regularly turned on or off at a carrier frequency, so as to drive the coil to implement reverse wireless charging.

(3) 125K low-frequency RFID card reader mode: Similar to the foregoing (2) reverse wireless charging mode, the coil drive circuit drives the 125K low-frequency RFID antenna to oscillate, an RFID card tag is energized to start after approaching a coil, and draws energy through load modulation, so that an oscillating voltage of a coil at a transmit end changes. In this case, an "envelope detection circuit" and an "internal demodulation circuit" implement demodulation of a load modulation signal, and then learn card number information of the RFID card tag approaching.

MOS transistor switching description: The first MOS transistor, the second MOS transistor, and the fifth MOS transistor are all turned off, the sixth MOS transistor is turned on, and the third MOS transistor and the fourth MOS transistor are turned on and off at a frequency of about 125 KHZ, so as to drive the coil.

(4) 125K low-frequency RFID card simulation mode: After it is detected that a card reader is approaching, a load modulation module inside the wireless charging IC implements load modulation by turning on or turning off a "125K low-frequency RFID load modulation circuit", and finally implements card number sending.

There are four manners: Manner 1: A current is drawn to form a load in a manner in which the first MOS transistor and the fourth MOS transistor are turned on. Manner 2: A current is drawn to form a load in a manner in which the second MOS transistor and the fourth MOS transistor are turned on. Manner 3: A current is drawn to form a load in a manner in which the fourth MOS transistor and the sixth MOS transistor are turned on. Manner 4: A current is drawn to form a load in a manner in which the first MOS transistor, the second MOS transistor, the fourth MOS transistor, and the sixth MOS transistor are turned on.

Beneficial effects of implementation of the present invention are as follows:

1. By sharing the wireless charging IC hardware, the wireless charging technology and the 125K RFID technology may be implemented simultaneously by adding only a small amount of external hardware.
2. Through a corresponding circuit design, the two functions can share some hardware without affecting each other.
3. By using the hybrid antenna design, a volume of the antenna can be minimized and costs can be optimized.
4. A dual wireless charging mode may be implemented, so as to improve a charging power and charging efficiency, or implement charging of two devices at the same time.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An electronic device, comprising a wireless charging circuit, an antenna module, and a matching circuit, wherein the matching circuit comprises a first resonant capacitor, a first load modulation capacitor, a second load modulation capacitor, and an envelope detection circuit, and the wireless charging circuit comprises a microcontroller unit, a demodulation circuit, an H-bridge drive circuit, a first load modulation circuit, and a second load modulation circuit, wherein
the H-bridge drive circuit comprises a first half-bridge drive circuit and a second half-bridge drive circuit, a first end of the first half-bridge drive circuit and a first end of the second half-bridge drive circuit are each electrically connected to a power supply end, a second end of the first half-bridge drive circuit and a second end of the second half-bridge drive circuit are each grounded, the first half-bridge drive circuit is electrically connected to the second half-bridge drive circuit sequentially by using the antenna module and the first resonant capacitor, and the H-bridge drive circuit is configured to drive the antenna module to operate in a wireless charging transmit mode, a wireless charging receive mode, an RFID card reader mode, or an RFID card simulation mode;

the first load modulation circuit is separately electrically connected to the antenna module and the envelope detection circuit by using the first load modulation capacitor, the second load modulation circuit is separately electrically connected to the antenna module, the first resonant capacitor, and the envelope detection circuit by using the second load modulation capacitor, and the envelope detection circuit is further electrically connected to the demodulation circuit; and the microcontroller unit is separately electrically connected to the demodulation circuit, the first load modulation circuit, the second load modulation circuit, the first half-bridge drive circuit, and the second half-bridge drive circuit.

2. The electronic device according to claim 1, wherein the antenna module comprises a radio frequency identification (RFID) coil and a wireless charging coil, and the matching circuit further comprises a gating switch and a second resonant capacitor, wherein a first end of the second resonant capacitor is electrically connected to the first load modulation circuit by using the first load modulation capacitor, and a second end of the second resonant capacitor is grounded;

the gating switch is separately electrically connected to a first point, a second point, the envelope detection circuit, and the microcontroller unit, the first point is a common point between the first resonant capacitor and a second end of the wireless charging coil, and the second point is a common point between the first load modulation capacitor and the second resonant capacitor;

a first end of the RFID coil is electrically connected to the first half-bridge drive circuit, and a second end of the RFID coil is electrically connected to the second point;

a first end of the wireless charging coil is electrically connected to the first half-bridge drive circuit, and the second end of the wireless charging coil is electrically connected to the second half-bridge drive circuit by using the first resonant capacitor; and the second load modulation circuit is electrically connected to the first point by using the second load modulation capacitor.

3. The electronic device according to claim 1, wherein the antenna module comprises a first coil, the first coil comprises a drive common terminal, a wireless power charge (WPC) terminal, and an RFID terminal, the WPC terminal is located between the drive common terminal and the RFID terminal, and the matching circuit further comprises a gating switch, a second resonant capacitor, and a first switch, wherein a first end of the second resonant capacitor is electrically connected to the first load modulation circuit by using the first load modulation capacitor, and a second end of the second resonant capacitor is grounded by using the first switch;

the gating switch is separately electrically connected to a first point, a second point, the envelope detection circuit, and the microcontroller unit, the first point is a common point between the first resonant capacitor and the WPC terminal, and the second point is a common point between the second resonant capacitor and the first load modulation capacitor;

the drive common terminal is electrically connected to the first half-bridge drive circuit, the WPC terminal is electrically connected to the second half-bridge drive circuit by using the first resonant capacitor, and the RFID terminal is electrically connected to the second point; and the second load modulation circuit is electrically connected to the first point by using the second load modulation capacitor.

4. The electronic device according to claim 1, wherein the antenna module comprises a second coil and a third coil, and the matching circuit further comprises a gating switch, a second resonant capacitor, and a first switch, wherein a first end of the second resonant capacitor is electrically connected to the first load modulation circuit by using the first load modulation capacitor, and a second end of the second resonant capacitor is grounded by using the first switch;

the gating switch is separately electrically connected to a first point, a second point, the envelope detection circuit, and the microcontroller unit, the first point is a common point between the first resonant capacitor and a second end of the second coil, and the second point is a common point between the second resonant capacitor and the first load modulation capacitor;

a first end of the second coil is electrically connected to the first half-bridge drive circuit, and the second end of the second coil is electrically connected to the second half-bridge drive circuit by using the first resonant capacitor;

a first end of the third coil is electrically connected to the first half-bridge drive circuit, and a second end of the third coil is electrically connected to the second point; and the second load modulation circuit is electrically connected to the first point by using the second load modulation capacitor.

5. The electronic device according to claim 1, wherein the antenna module comprises a fourth coil, wherein a first end of the fourth coil is electrically connected to the second half-bridge drive circuit by using the first resonant capacitor, and a second end of the fourth coil is electrically connected to the first half-bridge drive circuit;

the envelope detection circuit is electrically connected to a first point, and the first point is a common point between the first resonant capacitor and the first end of the fourth coil;

the first load modulation circuit is electrically connected to the first point by using the first load modulation capacitor; and the second load modulation circuit is electrically connected to the first point by using the second load modulation capacitor.

6. The electronic device according to claim 1, wherein the first load modulation circuit comprises a first field effect MOS transistor, and the second load modulation circuit comprises a second MOS transistor, wherein the first MOS transistor and the second MOS transistor are N-type MOS transistors;

a gate of the first MOS transistor is electrically connected to the microcontroller unit, a drain of the first MOS transistor is electrically connected to the first load modulation capacitor, and a source of the first MOS transistor is grounded; and a gate of the second MOS transistor is electrically connected to the microcontroller unit, a drain of the second MOS transistor is electrically connected to the second load modulation capacitor, and a source of the second MOS transistor is grounded.

7. The electronic device according to claim 1, wherein the first half-bridge drive circuit comprises a third MOS transistor and a fourth MOS transistor, and the second half-bridge drive circuit comprises a fifth MOS transistor and a sixth MOS transistor, wherein the third MOS transistor and the fifth MOS transistor are P-type MOS transistors, and the fourth MOS transistor and the sixth MOS transistor are N-type MOS transistors;

gates of the third MOS transistor, the fourth MOS transistor, the fifth MOS transistor, and the sixth MOS transistor are each electrically connected to the microcontroller unit, sources of the third MOS transistor and the fifth MOS transistor are each electrically connected to the power supply end, a drain of the third MOS transistor is electrically connected to a drain of the fourth MOS transistor, a drain of the fifth MOS transistor is electrically connected to a drain of the sixth MOS transistor, and sources of the fourth MOS transistor and the sixth MOS transistor are each grounded; and a third point and a fourth point are each electrically connected to the antenna module, the third point is a common point between the drain of the third MOS transistor and the drain of the fourth MOS transistor, and the fourth point is a common point between the drain of the fifth MOS transistor and the drain of the sixth MOS transistor.

8. The electronic device according to claim 1, wherein an operating mode of the electronic device comprises a wireless charging receive mode, a wireless charging transmit mode, an RFID card reader mode, and an RFID card simulation mode.

9. The electronic device according to claim 1, wherein the envelope detection circuit and the demodulation circuit are configured to determine a transmit power of the antenna module, and determine a card number of an RFID card.

10. A control method, applied to an electronic device, wherein the method comprises:

determining a first operating mode in which the electronic device is located, wherein the first operating mode is a wireless charging receive mode, a wireless charging transmit mode, an RFID card reader mode, or an RFID card simulation mode; and controlling an operating state of the electronic device based on the first operating mode;

wherein the electronic device comprises a wireless charging circuit, an antenna module, and a matching circuit, wherein the matching circuit comprises a first resonant capacitor, a first load modulation capacitor, a second load modulation capacitor, and an envelope detection circuit, and the wireless charging circuit comprises a microcontroller unit, a demodulation circuit, an H-bridge drive circuit, a first load modulation circuit, and a second load modulation circuit, wherein the H-bridge drive circuit comprises a first half-bridge drive circuit and a second half-bridge drive circuit, a first end of the first half-bridge drive circuit and a first end of the second half-bridge drive circuit are each electrically connected to a power supply end, a second end of the first half-bridge drive circuit and a second end of the second half-bridge drive circuit are each grounded, the first half-bridge drive circuit is electrically connected to the second half-bridge drive circuit sequentially by using the antenna module and the first resonant capacitor, and the H-bridge drive circuit is configured to drive the antenna module to operate in a wireless charging transmit mode, a wireless charging receive mode, an RFID card reader mode, or an RFID card simulation mode;

the first load modulation circuit is separately electrically connected to the antenna module and the envelope detection circuit by using the first load modulation capacitor, the second load modulation circuit is separately electrically connected to the antenna module, the first resonant capacitor, and the envelope detection circuit by using the second load modulation capacitor, and the envelope detection circuit is further electrically connected to the demodulation circuit; and the microcontroller unit is separately electrically connected to the demodulation circuit, the first load modulation circuit, the second load modulation circuit, the first half-bridge drive circuit, and the second half-bridge drive circuit.

11. The method according to claim 10, wherein the first load modulation circuit comprises the first MOS transistor, and the second load modulation circuit comprises the second MOS transistor; and the first half-bridge drive circuit comprises the third MOS transistor and the fourth MOS transistor, and the second half-bridge drive circuit comprises the fifth MOS transistor and the sixth MOS transistor.

12. The method according to claim 11, wherein the first operating mode is a wireless charging receive mode; and the controlling an operating state of the electronic device based on the first operating mode comprises:

in a case that the antenna module comprises the RFID coil and the wireless charging coil, turning off the first MOS transistor, turning on or off the second MOS transistor at a first preset frequency, and turning on or off a first target MOS transistor and a second target MOS transistor alternately at a second preset frequency; or in a case that the antenna module comprises the first coil, turning off the first MOS transistor and the first switch, turning on or off the second MOS transistor at a first preset frequency, and turning on or off a first target MOS transistor and a second target MOS transistor alternately at a second preset frequency; or in a case that the antenna module comprises the second coil and the third coil, turning off the first MOS transistor and the first switch, turning on or off a first target MOS transistor and a second target MOS transistor alternately at a second preset frequency, and controlling an operating state of the second MOS transistor to be the same as an operating state of the fourth MOS transistor; or turning off the fifth MOS transistor and the sixth MOS transistor, turning on or off the third MOS transistor and the fourth MOS transistor alternately at a second preset frequency, controlling the first switch to be turned on when the third MOS transistor is turned on, and controlling an operating state of the first MOS transistor to be the same as an operating state of the fourth MOS transistor or the first switch; or turning on the first switch, turning on or off a third target MOS transistor at a first preset frequency, and turning on or off a first target MOS transistor and a second target MOS transistor alternately at a second preset frequency; or in a case that the antenna module comprises the fourth coil, turning off the first MOS transistor, turning on or off the second MOS transistor at a first preset frequency, and turning on or off a first target MOS transistor and a second target MOS transistor alternately at a second preset frequency, wherein the first target MOS transistor comprises the third MOS transistor and the sixth MOS transistor, the second target MOS transistor comprises the fourth MOS transistor and the fifth MOS transistor, and the third target MOS transistor is the first MOS transistor or the second MOS transistor.

13. The method according to claim 11, wherein the first operating mode is a wireless charging transmit mode; and
the controlling an operating state of the electronic device based on the first operating mode comprises:
in a case that the antenna module comprises the RFID coil and the wireless charging coil, turning off the first MOS transistor and the second MOS transistor, turning on or off a first target MOS transistor and a second target MOS transistor alternately at a second preset frequency, and controlling the gating switch to connect the envelope detection circuit and the first point; or
in a case that the antenna module comprises the first coil, turning off the first MOS transistor, the second MOS transistor, and the first switch, turning on or off a first target MOS transistor and a second target MOS transistor alternately at a second preset frequency, and controlling the gating switch to connect the envelope detection circuit and the first point; or
in a case that the antenna module comprises the second coil and the third coil, turning off the first MOS transistor, the second MOS transistor, and the first switch, turning on or off a first target MOS transistor and a second target MOS transistor alternately at a second preset frequency, and controlling the gating switch to connect the envelope detection circuit and the first point; or turning off the first MOS transistor, the second MOS transistor, the fifth MOS transistor, and the sixth MOS transistor, turning on or off the third MOS transistor and the fourth MOS transistor alternately at a second preset frequency, controlling the first switch to be turned on when the third MOS transistor is turned on, and controlling the gating switch to connect the envelope detection circuit and the second point; or turning off the first MOS transistor and the second MOS transistor, turning on the first switch, turning on or off a first target MOS transistor and a second target MOS transistor alternately at a second preset frequency, and controlling the gating switch to alternately connect the envelope detection circuit and the first point or connect the envelope detection circuit and the second point; or
in a case that the antenna module comprises the fourth coil, turning off the first MOS transistor and the second MOS transistor, and turning on or off a first target MOS transistor and a second target MOS transistor alternately at a second preset frequency, wherein
the first target MOS transistor comprises the third MOS transistor and the sixth MOS transistor, and the second target MOS transistor comprises the fourth MOS transistor and the fifth MOS transistor.

14. The method according to claim 11, wherein the first operating mode is an RFID card reader mode; and
the controlling an operating state of the electronic device based on the first operating mode comprises:
in a case that the antenna module comprises the RFID coil and the wireless charging coil, turning off the first MOS transistor, the second MOS transistor, the fifth MOS transistor, and the sixth MOS transistor, and turning on or off the third MOS transistor and the fourth MOS transistor alternately at a second preset frequency; or
in a case that the antenna module comprises the first coil, turning off the first MOS transistor, the second MOS transistor, the fifth MOS transistor, and the sixth MOS transistor, turning on the first switch, turning on or off the third MOS transistor and the fourth MOS transistor alternately at a second preset frequency, and controlling the gating switch to connect the envelope detection circuit and the second point; or
in a case that the antenna module comprises the second coil and the third coil, turning off the first MOS transistor, the second MOS transistor, the fifth MOS transistor, and the first switch, turning on the sixth MOS transistor, turning on or off the third MOS transistor and the fourth MOS transistor alternately at a second preset frequency, and controlling the gating switch to connect the envelope detection circuit and the first point; or turning off the first MOS transistor, the second MOS transistor, the fifth MOS transistor, and the sixth MOS transistor, turning on the first switch, turning on or off the third MOS transistor and the fourth MOS transistor alternately at a second preset frequency, and controlling the gating switch to connect the envelope detection circuit and the second point; or turning on or off the third MOS transistor and the fourth MOS transistor alternately at a second preset frequency, turning on the sixth MOS transistor and the first switch, turning off the first MOS transistor, the second MOS transistor, and the fifth MOS transistor, and controlling the gating switch to alternately connect the envelope detection circuit and the first point or connect the envelope detection circuit and the second point; or
in a case that the antenna module comprises the fourth coil, turning off the first MOS transistor, the second MOS transistor, and the fifth MOS transistor, turning on the sixth MOS transistor, and turning on or off the third MOS transistor and the fourth MOS transistor alternately at a second preset frequency.

15. The method according to claim 11, wherein the first operating mode is an RFID card simulation mode; and
the controlling an operating state of the electronic device based on the first operating mode comprises:
in a case that the antenna module comprises the RFID coil and the wireless charging coil, turning on or off the first MOS transistor and the fourth MOS transistor alternately at a third preset frequency, and turning off another MOS transistor; or keeping the first MOS transistor on, turning on or off the fourth MOS transistor alternately at a third preset frequency, and turning off another MOS transistor; or keeping the fourth MOS transistor on, turning on or off the first MOS transistor alternately at a third preset frequency, and turning off another MOS transistor; or
in a case that the antenna module comprises the first coil, turning on or off the first MOS transistor and the fourth MOS transistor alternately at a third preset frequency, and turning off another MOS transistor and the first switch; or turning on or off a fourth switch and the first switch alternately at a third preset frequency, and turning off another MOS transistor; or turning on or off the first MOS transistor, the fourth MOS transistor, and the first switch alternately at a third preset frequency, and turning off another MOS transistor; or in a case that the antenna module comprises the second coil and the third coil, turning on or off the second MOS transistor and the fourth MOS transistor alternately at a third preset frequency, and turning off another MOS transistor and the first switch; or turning on or off the fourth MOS transistor and the sixth MOS transistor alternately at a third preset frequency, and turning off another MOS transistor and the first switch; or turning on or off the second MOS transistor, the fourth MOS transistor, and the sixth MOS transistor alternately at a third preset frequency, and turning off another MOS transistor and the first switch; or turning on or off the first MOS transistor and the fourth MOS transistor alternately at a third preset frequency, and turning off another MOS transistor and the first switch; or turning on or off a fourth switch and the first switch alternately at a third preset frequency, and turning off another MOS transistor; or turning on or off the first MOS transistor, the fourth MOS transistor, and the first switch alternately at a third preset frequency, and turning off another MOS transistor; or turning on or off the first MOS transistor, the second MOS transistor, and the fourth MOS transistor alternately at a third preset frequency, and turning off another MOS transistor and the first switch; or in a case that the antenna module comprises the fourth coil, turning on or off the first MOS transistor and the fourth MOS transistor alternately at a third preset frequency, and turning off another MOS transistor; or turning on or off the second MOS transistor and the sixth MOS transistor alternately at a third preset frequency, and turning off another MOS transistor; or turning on or off the fourth MOS transistor and the sixth MOS transistor alternately at a third preset frequency, and turning off another MOS transistor; or turning on or off the first MOS transistor, the second MOS transistor, the fourth MOS transistor, and the sixth MOS transistor alternately at a third preset frequency, and turning off another MOS transistor.

16. The method according to claim 10, wherein the antenna module comprises a radio frequency identification (RFID) coil and a wireless charging coil, and the matching circuit further comprises a gating switch and a second resonant capacitor, wherein
 a first end of the second resonant capacitor is electrically connected to the first load modulation circuit by using the first load modulation capacitor, and a second end of the second resonant capacitor is grounded;
 the gating switch is separately electrically connected to a first point, a second point, the envelope detection circuit, and the microcontroller unit, the first point is a common point between the first resonant capacitor and a second end of the wireless charging coil, and the second point is a common point between the first load modulation capacitor and the second resonant capacitor;
 a first end of the RFID coil is electrically connected to the first half-bridge drive circuit, and a second end of the RFID coil is electrically connected to the second point;
 a first end of the wireless charging coil is electrically connected to the first half-bridge drive circuit, and the second end of the wireless charging coil is electrically connected to the second half-bridge drive circuit by using the first resonant capacitor; and
 the second load modulation circuit is electrically connected to the first point by using the second load modulation capacitor.

17. The method according to claim 10, wherein the antenna module comprises a first coil, the first coil comprises a drive common terminal, a wireless power charge (WPC) terminal, and an RFID terminal, the WPC terminal is located between the drive common terminal and the RFID terminal, and the matching circuit further comprises a gating switch, a second resonant capacitor, and a first switch, wherein
 a first end of the second resonant capacitor is electrically connected to the first load modulation circuit by using the first load modulation capacitor, and a second end of the second resonant capacitor is grounded by using the first switch;
 the gating switch is separately electrically connected to a first point, a second point, the envelope detection circuit, and the microcontroller unit, the first point is a common point between the first resonant capacitor and the WPC terminal, and the second point is a common point between the second resonant capacitor and the first load modulation capacitor;
 the drive common terminal is electrically connected to the first half-bridge drive circuit, the WPC terminal is electrically connected to the second half-bridge drive circuit by using the first resonant capacitor, and the RFID terminal is electrically connected to the second point; and
 the second load modulation circuit is electrically connected to the first point by using the second load modulation capacitor.

18. The method according to claim 10, wherein the antenna module comprises a second coil and a third coil, and the matching circuit further comprises a gating switch, a second resonant capacitor, and a first switch, wherein
 a first end of the second resonant capacitor is electrically connected to the first load modulation circuit by using the first load modulation capacitor, and a second end of the second resonant capacitor is grounded by using the first switch;
 the gating switch is separately electrically connected to a first point, a second point, the envelope detection circuit, and the microcontroller unit, the first point is a common point between the first resonant capacitor and a second end of the second coil, and the second point is a common point between the second resonant capacitor and the first load modulation capacitor;
 a first end of the second coil is electrically connected to the first half-bridge drive circuit, and the second end of the second coil is electrically connected to the second half-bridge drive circuit by using the first resonant capacitor;
 a first end of the third coil is electrically connected to the first half-bridge drive circuit, and a second end of the third coil is electrically connected to the second point; and
 the second load modulation circuit is electrically connected to the first point by using the second load modulation capacitor.

19. The method according to claim 10, wherein the antenna module comprises a fourth coil,
 wherein a first end of the fourth coil is electrically connected to the second half-bridge drive circuit by using the first resonant capacitor, and a second end of the fourth coil is electrically connected to the first half-bridge drive circuit;

the envelope detection circuit is electrically connected to a first point, and the first point is a common point between the first resonant capacitor and the first end of the fourth coil;

the first load modulation circuit is electrically connected to the first point by using the first load modulation capacitor; and the second load modulation circuit is electrically connected to the first point by using the second load modulation capacitor.

20. The method according to claim 10, wherein the first load modulation circuit comprises a first field effect MOS transistor, and the second load modulation circuit comprises a second MOS transistor, wherein the first MOS transistor and the second MOS transistor are N-type MOS transistors;

a gate of the first MOS transistor is electrically connected to the microcontroller unit, a drain of the first MOS transistor is electrically connected to the first load modulation capacitor, and a source of the first MOS transistor is grounded; and a gate of the second MOS transistor is electrically connected to the microcontroller unit, a drain of the second MOS transistor is electrically connected to the second load modulation capacitor, and a source of the second MOS transistor is grounded.

\* \* \* \* \*